(12) United States Patent
Matsushima

(10) Patent No.: US 9,513,516 B2
(45) Date of Patent: Dec. 6, 2016

(54) LIQUID CRYSTAL DISPLAY DEVICE HAVING A PLURALITY OF COMB-SHAPED PORTIONS PROTRUDING FROM AN ELECTRODE BASE PORTION AND ELECTRONIC APPARATUS

(71) Applicant: Japan Display Inc., Tokyo (JP)

(72) Inventor: Toshiharu Matsushima, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/229,058

(22) Filed: Mar. 28, 2014

(65) Prior Publication Data
US 2014/0293177 A1   Oct. 2, 2014

(30) Foreign Application Priority Data

Mar. 29, 2013   (JP) ................................ 2013-075003
Mar. 26, 2014   (JP) ................................ 2014-064840

(51) Int. Cl.
*G02F 1/1343*   (2006.01)
(52) U.S. Cl.
CPC ............... *G02F 1/134363* (2013.01)
(58) Field of Classification Search
CPC ............ G02F 1/134309; G02F 1/1337; G02F 1/13306; G02F 1/134363; G02F 2001/134318; G02F 2001/134372; G09G 2320/041
USPC .......................................... 349/33, 123, 141
See application file for complete search history.

(56) References Cited

U.S. PATENT DOCUMENTS

| | | | |
|---|---|---|---|
| 2006/0203169 A1* | 9/2006 | Ozawa | G02F 1/134363 349/141 |
| 2006/0215101 A1* | 9/2006 | Yamazaki | G02F 1/134309 349/143 |
| 2010/0002158 A1* | 1/2010 | Ishihara | G02F 1/134363 349/33 |
| 2012/0249928 A1* | 10/2012 | Kaihoko | G02B 5/3083 349/69 |
| 2014/0160386 A1* | 6/2014 | Toko | G02F 1/133784 349/42 |
| 2014/0192298 A1* | 7/2014 | Sumiyoshi | G02F 1/134336 349/96 |
| 2015/0042922 A1* | 2/2015 | Kawahira | G02F 1/133555 349/61 |

FOREIGN PATENT DOCUMENTS

JP   2008-052161   3/2008

* cited by examiner

*Primary Examiner* — Paul Lee
(74) *Attorney, Agent, or Firm* — Michael Best & Friedrich LLP

(57) ABSTRACT

According to an aspect, a liquid crystal display device includes: a first substrate and a second substrate that face each other; a liquid crystal layer provided between the first substrate and the second substrate; and a first electrode and a second electrode provided between the first substrate and the liquid crystal layer. The first electrode includes: an electrode base portion that extends in a first direction; and a plurality of comb-shaped portions that protrude from the electrode base portion at a fixed distance away from each other, and extend in a second direction different from the first direction. Each of the comb-shaped portions is configured such that a width thereof at a protrusion start position of the electrode base portion is smaller than a number obtained by multiplying an array pitch of adjacent comb-shaped portions by 0.5.

10 Claims, 24 Drawing Sheets

| L2 [μm] | ANGLE θ [DEGREE] | DETERMINED AS: |
|---|---|---|
| 15 | 0.00 | A |
| | 0.55 | A |
| 30 | 0.00 | C |
| | 0.22 | C |
| | 0.55 | B |
| | 0.62 | A |
| | 0.70 | B |
| | 1.01 | A |
| 62.5 | 0.00 | C |
| | 0.69 | A |

LIQUID CRYSTAL DISPLAY DEVICE HAVING A PLURALITY OF COMB-SHAPED PORTIONS PROTRUDING FROM AN ELECTRODE BASE PORTION AND ELECTRONIC APPARATUS

CROSS-REFERENCE TO RELATED APPLICATIONS

This application claims priority from Japanese Application No. 2013-075003, filed on Mar. 29, 2013, and Japanese Application No. 2014-064840, filed on Mar. 26, 2014, the contents of which are incorporated by reference herein in its entirety.

BACKGROUND

1. Technical Field

The present disclosure relates to a liquid crystal display device with liquid crystal. The present disclosure also relates to an electronic apparatus including the liquid crystal display device with liquid crystal.

2. Description of the Related Art

As a system (mode) of driving liquid crystal, a liquid crystal drive system using an electric field generated in a vertical direction between substrates, i.e., using a so-called vertical electric field is known. As a liquid crystal display device that drives liquid crystal using the vertical electric field, a liquid crystal display device of a vertical electric field type such as a twisted nematic (TN) type, a vertical alignment (VA) type, and an electrically controlled birefringence (ECB) type is known. In addition, as described in Japanese Patent Application Laid-open Publication No. 2008-52161 (JP-A-2008-52161), as a system of driving liquid crystal, a liquid crystal drive system using an electric field generated in a direction (horizontal direction) parallel to a substrate, i.e., using a so-called horizontal electric field is known. As the liquid crystal display device that drives liquid crystal using the horizontal electric field, a liquid crystal display device of the horizontal electric field type such as a fringe field switching (FFS) type and an in-plane switching (IPS) type is also known.

In IPS mode, a first electrode and a second electrode are formed in the same layer, and an electric field is generated mainly in a direction parallel to a substrate surface. Therefore, an electric field is difficult to be formed in an area just above the first electrode, and liquid crystal molecules in the area are therefore hard to be driven.

In FFS mode, a pixel electrode and a common electrode are overlaid via a dielectric film in a direction perpendicular to a substrate surface, and an electric field is generated mainly in a direction obliquely with respect to a substrate surface or in a parabolic shape (also called "fringe electric field"). Therefore, liquid crystal molecules in an area right above the pixel electrode are easily driven. In other words, a higher aperture ratio can be obtained in the FFS mode than in the IPS mode.

The horizontal electric field type liquid crystal display device is configured to generate an electric field between the first electrode and the second electrode and in a direction parallel to the substrate to thereby rotate the liquid crystal molecules in plane parallel to the substrate surface, and to perform a display using a change in light transmittance corresponding to the rotation of the liquid crystal molecules. The horizontal electric field type liquid crystal display device is required to improve a response speed of the liquid crystal.

SUMMARY

According to an aspect, a liquid crystal display device includes: a first substrate and a second substrate that face each other; a liquid crystal layer provided between the first substrate and the second substrate; and a first electrode and a second electrode provided between the first substrate and the liquid crystal layer. The first electrode includes: an electrode base portion that extends in a first direction; and a plurality of comb-shaped portions that protrude from the electrode base portion at a fixed distance away from each other, and extend in a second direction different from the first direction. Each of the comb-shaped portions is configured such that a width thereof at a protrusion start position of the electrode base portion is smaller than a number obtained by multiplying an array pitch of adjacent comb-shaped portions by 0.5.

According to another aspect, an electronic apparatus includes: a liquid crystal display device; and a control device that supplies an input signal to the liquid crystal display device.

BRIEF DESCRIPTION OF THE DRAWINGS

FIG. 31 is a partially enlarged view in which FIG. 30 is partially enlarged;

DETAILED DESCRIPTION

Exemplary embodiments of the present disclosure will be explained in detail below with reference to the accompanying drawings. The present disclosure is not limited by the contents described in the following embodiments. In addition, the components described as follows include those which can be easily conceived by persons skilled in the art and those which are substantially identical thereto. Moreover, the components described as follows can be arbitrarily combined with each other. The explanation is performed in the following order.

1. Embodiments (Liquid Crystal Display Device)
1-1. First Embodiment
1-2. Second Embodiment
2. Application Examples (Electronic Apparatuses)
Examples of applying the liquid crystal display device according to the embodiments to electronic apparatuses.
3. Aspects of Present Disclosure

1. EMBODIMENTS

Liquid Crystal Display Device 1-1. First Embodiment

Figure 1:
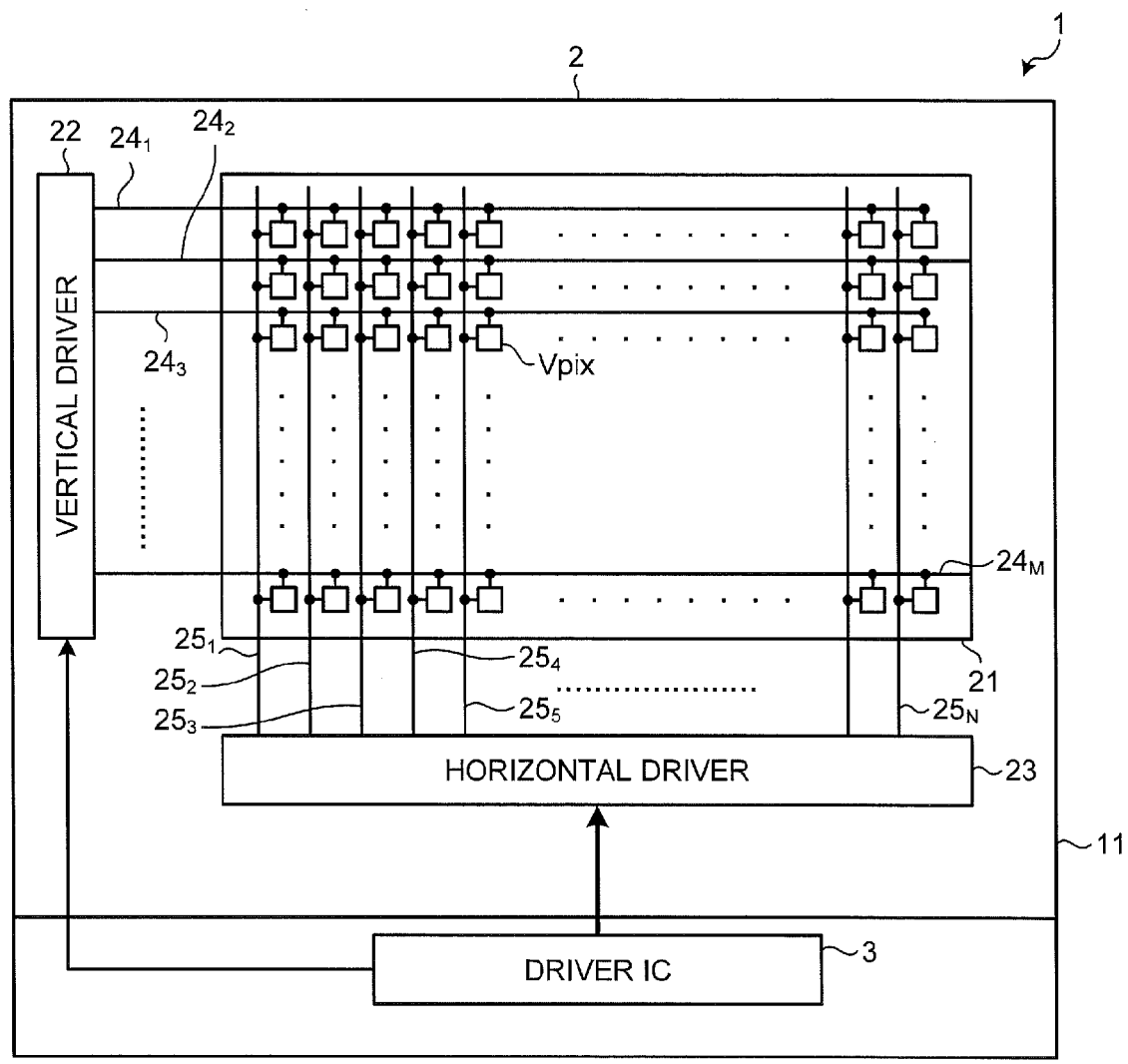
FIG. 1 is a block diagram of a system configuration example of a liquid crystal display device according to a first embodiment.

FIG. 1 is a block diagram of a system configuration example of a liquid crystal display device according to a present embodiment. A display device 1 corresponds to a specific example of "liquid crystal display device" according to the present disclosure.

The display device 1 is a transmissive liquid crystal display device, and includes a display panel 2 and a driver integrated circuit (IC) 3. Flexible printed circuits (FPC) (not illustrated) transmit an external signal and/or drive power for driving the driver IC 3 to the driver IC 3. The display panel 2 includes a translucent insulating substrate such as a glass substrate 11, a display area 21 provided on the surface of the glass substrate 11 and on which a number of pixels including liquid crystal cells are arranged in a matrix (in the form of rows and columns), a horizontal driver (horizontal drive circuit) 23, and a vertical driver (vertical drive circuit) 22. The glass substrate 11 includes a first substrate, on which a number of pixel circuits including active elements (e.g., transistors) are arranged in a matrix, and a second substrate arranged opposite to the first substrate with a predetermined gap. The gap between the first substrate and the second substrate is kept at a predetermined gap by photo spacers formed and disposed at locations on the first substrate. The liquid crystal is then sealed between the first substrate and the second substrate.

System Configuration Example of Liquid Crystal Display Device

The display panel 2 includes the display area 21, the driver IC 3 having functions of an interface (I/F) and a timing generator, the vertical driver 22, and the horizontal driver 23, which are provided on the glass substrate 11.

In the display area 21, pixels Vpix that include a liquid crystal layer have a matrix structure in which units each forming one pixel on the display are arranged in M rows×N columns. In this specification, the row indicates a pixel row having N pieces of pixels Vpix arrayed in one direction. The column indicates a pixel column having M pieces of pixels Vpix arrayed in a direction perpendicular to the direction in which the pixels Vpix included in the row are arrayed. The values of M and N are determined according to a vertical display resolution and a horizontal display resolution. In the display area 21, each of scan lines $24_1$, $24_2$, $24_3$ ... $24_M$ is wired in each row and each of data lines $25_1$, $25_2$, $25_3$ ... $25_N$ is wired in each column with respect to an M-row/N-column array of the pixels Vpix. In the embodiments, scan lines 24 may be hereinafter described as a representative of the scan lines $24_1$, $24_2$, $24_3$ ... $24_M$, and data lines 25 may be hereinafter described as a representative of the data lines $25_1$, $25_2$, $25_3$ ... $25_N$. Moreover, in the embodiments, arbitrary three scan lines of the scan lines $24_1$, $24_2$, $24_3$ ... $24_M$ are described as scan lines $24_m$, $24_{m+1}$, and $24_{m+2}$ (where m is a natural number satisfying m≤M−2), and arbitrary three data lines of the data lines $25_1$, $25_2$, $25_3$ ... $25_N$ are described as data lines $25_n$, $25_{n+1}$, and $25_{n+2}$ (where n is a natural number satisfying n≤N−2).

The display device 1 receives a master clock, a horizontal synchronization signal, and a vertical synchronization signal, which are external signals, input from an external device, and supplies the signals to the driver IC 3. The driver IC 3 converts the level of the master clock, the horizontal synchronization signal, and the vertical synchronization signal each of which has a voltage magnitude of an external power supply to a voltage magnitude of an internal power supply required for driving the liquid crystal, to generate a master clock, a horizontal synchronization signal, and a vertical synchronization signal. The driver IC 3 supplies the generated master clock, horizontal synchronization signal, and vertical synchronization signal to the vertical driver 22 and the horizontal driver 23 respectively. The driver IC 3 generates common potential for a common electrode COM, explained later, for each pixel Vpix, to be commonly applied to the pixels, and supplies the generated common potential to the display area 21.

The vertical driver 22 synchronizes a vertical clock pulse to sequentially sample and latch display data output from the driver IC 3 in one horizontal period. The vertical driver 22 sequentially outputs the latched one-line digital data as a vertical scan pulse to be supplied to the scan lines $24_m$, $24_{m+1}$, and $24_{m+2}$ ... the display area 21, and thereby sequentially selects pixels Vpix row by row. The vertical driver 22 sequentially outputs the digital data from, for example, an upper side of the scan lines $24_m$, $24_{m+1}$, and $24_{m+2}$ ... of the display area 21, i.e., from an upper direction of vertical scanning to a lower side of the display area 21, i.e., to a lower direction of the vertical scanning. The vertical driver 22 can also sequentially output the digital data from the lower side of the scan lines $24_m$, $24_{m+1}$, and $24_{m+2}$ ... of the display area 21, i.e., from the lower direction of the vertical scanning to the upper side of the display area 21, i.e., to the upper direction of the vertical scanning.

The horizontal driver 23 is supplied with, for example, 6-bit R (red), G (green), and B (blue) digital video data Vsig. The horizontal driver 23 writes display data to each pixel Vpix of a row selected through vertical scanning performed by the vertical driver 22 for each pixel, or for each pixels, or for all pixels at one time via the data lines 25.

In the display device 1, when a direct voltage having the same polarity is continuously applied to liquid crystal elements, this possibly causes deterioration of specific resistance (substance-specific resistance) of the liquid crystal, or the like. The display device 1 adopts a drive system for inverting the polarity of a video signal in a predetermined period with respect to common potential of a drive signal in order to prevent the deterioration of the specific resistance (substance-specific resistance) of the liquid crystal, or the like.

As the drive system for the liquid crystal display panel, drive systems such as line inversion drive system, dot inversion drive system, and frame inversion drive system are known. The line inversion drive system is a drive system of inverting the polarities of video signals in a time period of 1H (H: horizontal period) corresponding to one line (one pixel row). The dot inversion drive system is a drive system of alternately inverting the polarities of video signals for each pixels on the left, right, top, and bottom adjacent to each other. The frame inversion drive system is a drive system of inverting video signals, which are written to all pixels for each frame corresponding to one screen, with the same polarity at one time. The display device 1 can also adopt any one of the drive systems.

Configuration Example of Display Area

Figure 2:
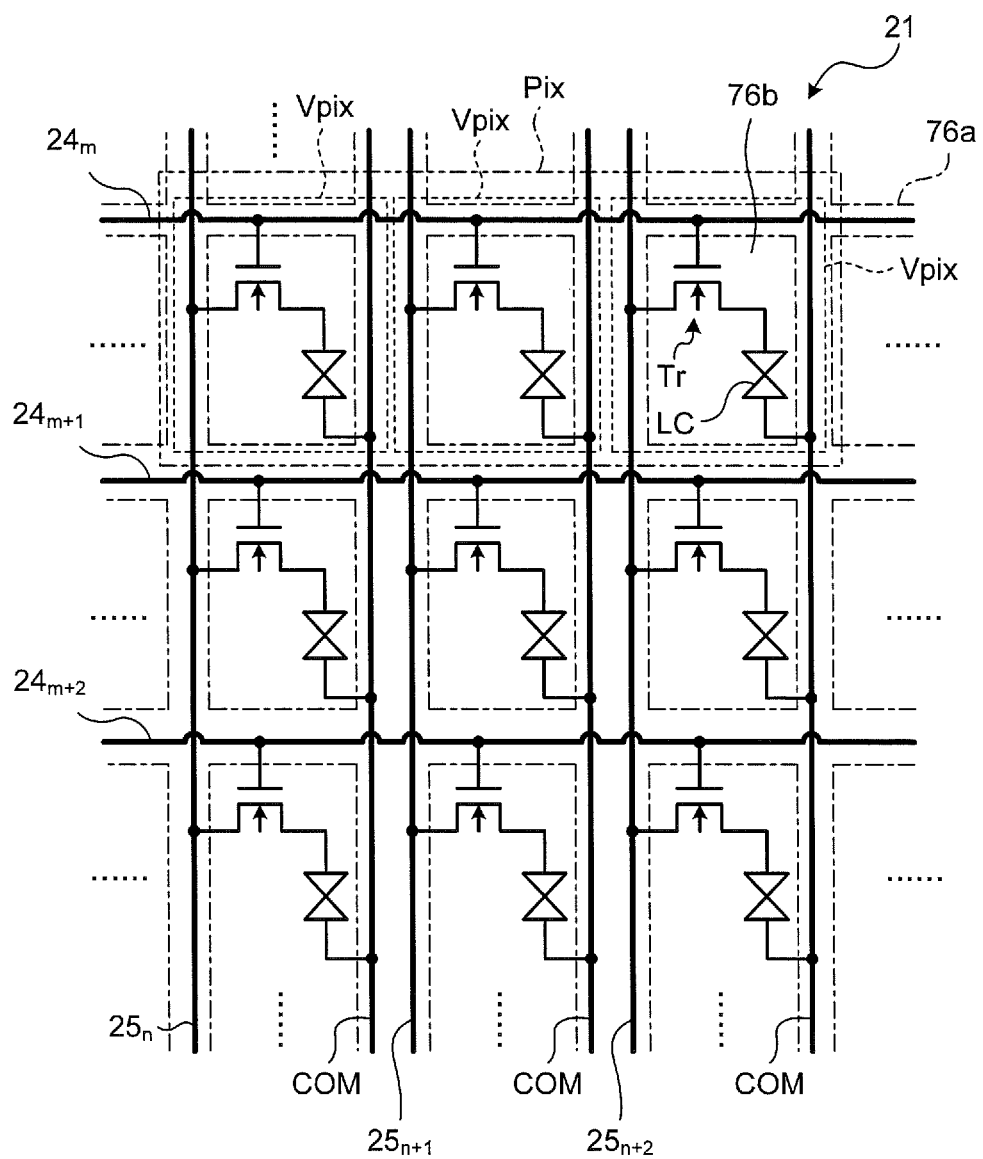
FIG. 2 is a circuit diagram of a drive circuit that drives pixels of the liquid crystal display device according to the first embodiment.

FIG. 2 is a circuit diagram of a drive circuit that drives pixels of the display device according to the first embodiment. Formed in the display area 21 are wirings such as the data lines $25_n$, $25_{n+1}$, and $25_{n+2}$ for supplying a pixel signal as display data to thin film transistor (TFT) elements Tr of the pixels Vpix and the scan lines $24_m$, $24_{m+1}$, and $24_{m+2}$ for driving the TFT elements Tr respectively. In this way, the data lines $25_n$, $25_{n+1}$, and $25_{n+2}$ are extended along a plane parallel to the surface of the glass substrate 11, to supply the pixel signal for displaying an image to the pixels Vpix. Each pixel Vpix includes the TFT element Tr and a liquid crystal element LC. The TFT element Tr includes a thin film transistor, which is an re-channel metal oxide semiconductor (MOS) TFT in this example. One end of a source or a drain of the TFT element Tr is coupled to one of the data lines $25_n$, $25_{n+1}$, and $25_{n+2}$, a gate thereof is coupled to one of the scan lines $24_m$, $24_{m+1}$, and $24_{m+2}$, and the other end of the source or the drain is coupled to one end of the liquid crystal element LC. The liquid crystal element LC is coupled at one end to the other end of the source or the drain of the TFT element Tr, and is coupled at the other end to the common electrode COM.

The pixel Vpix is coupled to the other pixels Vpix belonging to the same row of the display area 21 through one of the scan lines $24_m$, $24_{m+1}$, and $24_{m+2}$. The scan lines $24_m$, $24_{m+1}$, and $24_{m+2}$ are coupled to the vertical driver 22 and are supplied with a vertical scan pulse of a scan signal from the vertical driver 22. The pixel Vpix is also coupled to the other pixels Vpix belonging to the same column of the display area 21 through one of the data lines $25_n$, $25_{n+1}$, and $25_{n+2}$. The data lines $25_n$, $25_{n+1}$, and $25_{n+2}$ are coupled to the horizontal driver 23 and are supplied with a pixel signal from the horizontal driver 23. Furthermore, the pixel Vpix is coupled to the other pixels Vpix belonging to the same column of the display area 21 through the common electrode COM. The common electrode COM is coupled to the driver IC 3 and is supplied with a drive signal from the driver IC 3.

The vertical driver 22 illustrated in FIG. 1 applies a vertical scan pulse to the gates of the TFT elements Tr of the pixels Vpix through the scan lines $24_m$, and $24_{m+2}$ illustrated in FIG. 2 to thereby sequentially select one row (one horizontal line), as a target to be driven for display, from among the pixels Vpix formed in the matrix in the display area 21. The horizontal driver 23 illustrated in FIG. 1 supplies the pixel signal to each of the pixels Vpix included in one horizontal line sequentially selected by the vertical driver 22 through the respective data lines $25_n$, $25_{n+1}$, and $25_{n+2}$ illustrated in FIG. 2. The pixels Vpix perform display of one horizontal line according to the supplied pixel signal. The driver IC 3 applies a drive signal so as to drive the common electrode COM.

As explained above, the display device 1 drives the vertical driver 22 so as to sequentially scan the scan lines $24_m$, $24_{m+1}$, and $24_{m+2}$ to thereby sequentially select one horizontal line. In the display device 1, the horizontal driver 23 supplies a pixel signal to the pixels Vpix belonging to the one horizontal line, to thereby perform display of the horizontal line one line by one line. Upon the display operation, the driver IC 3 applies the drive signal to the common electrode COM.

The display area 21 has a color filter. The color filter has a lattice-shaped black matrix 76a and openings 76b. The black matrix 76a is formed so as to cover the outer periphery of each pixel Vpix as illustrated in FIG. 2. That is, the black matrix 76a is arranged on boundaries each between two-dimensionally arranged pixel Vpix and pixel Vpix, and a lattice shape is thereby formed. The black matrix 76a is formed of a material having a high light absorptivity. The openings 76b are formed by the lattice shape of the black matrix 76a and are arranged corresponding to each pixel Vpix.

The openings 76b include color areas colored in three colors of, for example, red (R), green (G), and blue (B). The color filter is structured to periodically array the color areas colored in the three colors, for example, red (R), green (G), and blue (B) in the openings 76b, and to associate the three color areas of R, G, and B with the pixels Vpix illustrated in FIG. 2 such that a set of the three color areas constitutes a pixel Pix.

The color filter may be a combination of other colors if the color areas are colored in different colors. In the color filter, the luminance of the color area of green (G) is generally higher than the luminance of the color area of red (R) and of the color area of blue (B). However, the color filter may not be provided and the color area of white is made there. Alternatively, light transmissive resin may be used for color filter to make the color area of white.

In the display area 21, the scan lines 24 and the data lines 25 are arranged in an area where they overlap the black matrix 76a of the color filter when viewed from a direction perpendicular to the front. In other words, the scan lines 24 and the data lines 25 are hidden behind the black matrix 76a when viewed from the direction perpendicular to the front. In the display area 21, the openings 76b are areas where the black matrix 76a is not arranged.

As illustrated in FIG. 2, the scan lines $24_m$, $24_{m+1}$, and $24_{m+2}$ are arranged at equal distances, and the data lines $25_n$, $25_{n+1}$, and $25_{n+2}$ are also arranged at equal distances. The pixels Vpix are arranged in areas partitioned by the adjacent scan lines $24_m$, $24_{m+1}$, and $24_{m+2}$ and the adjacent data lines $25_n$, $25_{n+1}$, and $25_{n+2}$ in the same orientation.

Figure 3:
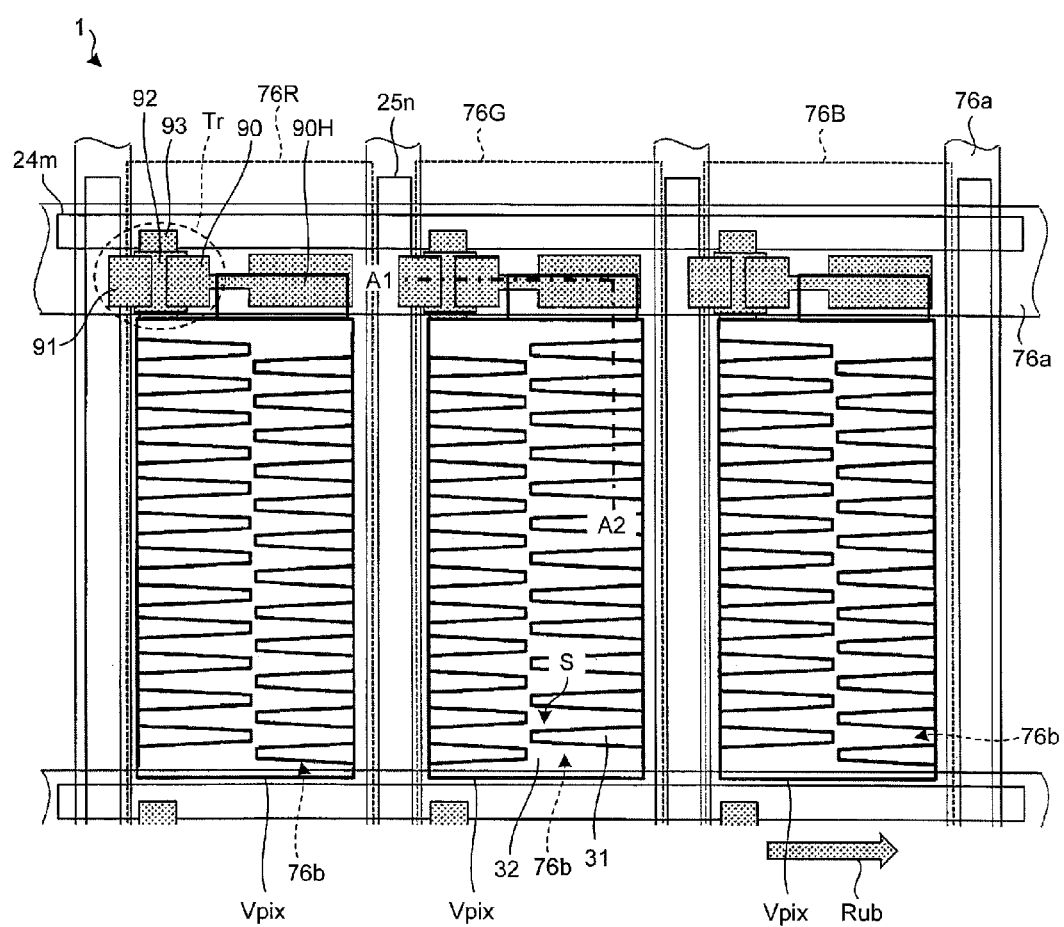
FIG. 3 is a plan view for explaining the pixels of the liquid crystal display device according to the first embodiment.

FIG. 3 is a plan view for explaining the pixels of the liquid crystal display device according to the first embodiment. Each of the pixels Vpix includes: the opening 76b formed in a lower part of the pixel in a vertical scanning direction (lower side in the figure); the TFT element Tr arranged in an upper left side of the pixel in the vertical scanning direction (upper side in the figure); and a contact 90H, through which a pixel electrode is coupled to a drain electrode of the TFT element Tr, formed in an upper right side of the pixel in the vertical scanning direction (upper side in the figure). The drain of the TFT element Tr includes part of a semiconductor layer (active layer) and a drain electrode 90. Likewise, the source of the TFT element Tr includes other part of the semiconductor layer (active layer) and a source electrode 91. As for color filters 76R, 76G, and 76B, color areas of the color filter colored in the three colors of, for example, red (R), green (G), and blue (B) are periodically arranged in the openings 76b to form the color areas of the three colors of R, G, and B in the respective pixels Vpix illustrated in FIG. 2.

Figure 4:
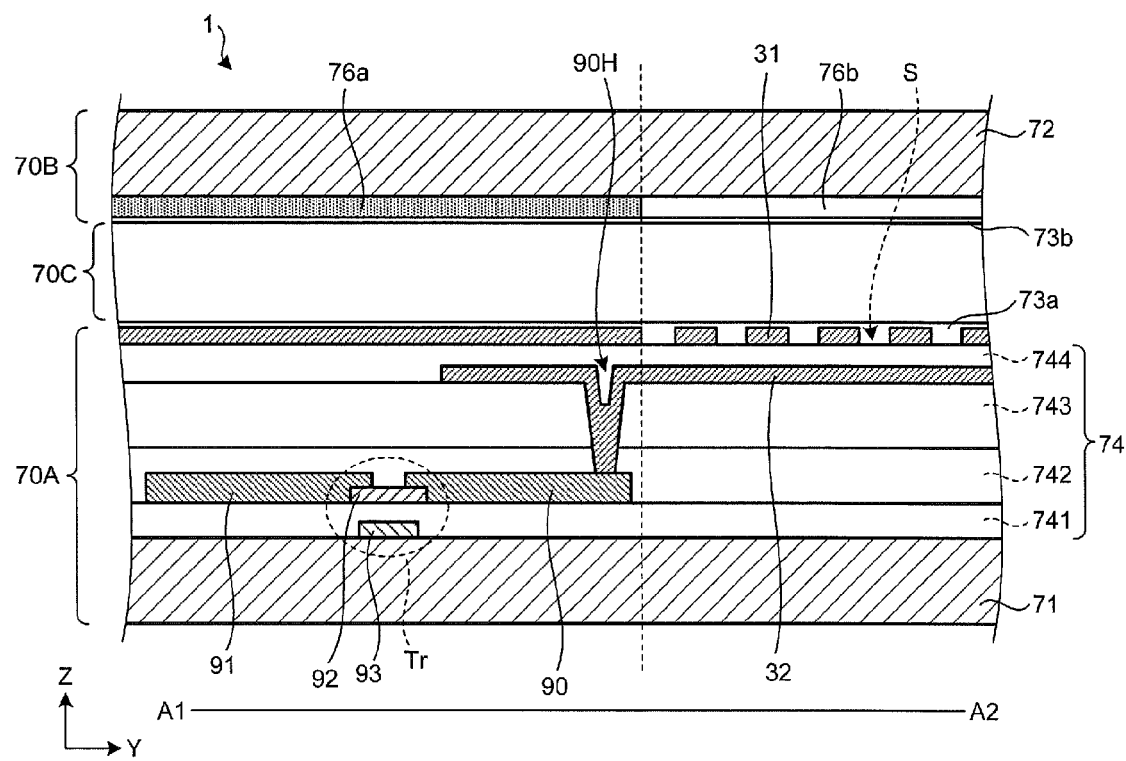
FIG. 4 is a schematic diagram of a cross section of line A1-A2 in FIG. 3.

FIG. 4 is a schematic diagram of a cross section of line A1-A2 in FIG. 3. The display device 1 includes, as illustrated in FIG. 4, a pixel substrate (first substrate) 70A, a counter substrate (second substrate) 70B oppositely arranged in a direction perpendicular to the surface of the pixel substrate 70A, and a liquid crystal layer 70C interposed between the pixel substrate 70A and the counter substrate 70B. A backlight (not illustrated) is arranged on the face of the pixel substrate 70A on the opposite side to the liquid crystal layer 70C. The photo spacers (not illustrated) keep a gap between the pixel substrate 70A and the counter substrate 70B at a predetermined gap.

In the liquid crystal layer 70C according to the first embodiment, an electric field (horizontal electric field) is generated in a direction parallel to a TFT substrate 71 of the pixel substrate 70A between a first electrode 31 and a second electrode 32 which are layered in a direction (Z direction) perpendicular to the surface of the TFT substrate 71, to thereby rotate the liquid crystal molecules of the liquid crystal layer 70C in plane parallel to the substrate surface, and a change in the light transmittance corresponding to the rotation of the liquid crystal molecules is used to perform display. For example, the second electrode 32 illustrated in FIG. 4 is the pixel electrode and the first electrode 31 is the common electrode COM. A first orientation film 73a and a second orientation film 73b are arranged between the liquid crystal layer 70C and the pixel substrate 70A and between the liquid crystal layer 70C and the counter substrate 70B, respectively, as illustrated in FIG. 4.

The counter substrate 70B includes a glass substrate 72 and the black matrix 76a having a light blocking effect formed over one face of the glass substrate 72. The black matrix 76a faces the liquid crystal layer 70C in the direction perpendicular to the pixel substrate 70A.

The pixel substrate 70A includes the TFT substrate 71 as a circuit board. The scan line $24_m$ illustrated in FIG. 3 is formed on the TFT substrate 71. A gate electrode 93 is electrically coupled to the scan line $24_m$. Further, in FIGS. 3 and 4, the scan line $24_m$ and the gate electrode 93 are formed in different layers. However, both the scan line $24_m$ and the gate electrode 93 can be integrally formed.

A semiconductor layer 92 including amorphous silicon (a-Si) constituting the TFT element Tr is formed above the gate electrode 93. The semiconductor layer 92 is coupled to the source electrode 91 constituting the TFT element Tr. The source electrode 91 is a conductor and is electrically coupled to a part of the semiconductor layer 92. The source electrode 91 is electrically coupled to the data line $25_n$ illustrated in FIG. 3. (The data line $25_n$ is not illustrated in FIG. 4.) The semiconductor layer 92 is coupled to the drain electrode 90 constituting the TFT element Tr. The drain electrode 90 is electrically coupled to another part of the semiconductor layer 92. Further, in FIG. 3, the data line $25_n$ and the source electrode 91 are formed in different layers. However, both the data line $25_n$ and the source electrode 91 can be integrally formed.

An insulating layer 74 has, for example, an insulating film 741 between the scan line $24_m$ and the semiconductor layer 92, an insulating film 742 between the semiconductor layer 92 and the data line $25_n$, an insulating film 743 between the data line $25_n$ and the second electrode 32, and an insulating film 744 between the second electrode 32 and the first electrode 31, which are layered in this order. The insulating films 741, 742, 743, and 744 may be the same insulating material as one another, or some of them may be a different material. For example, the insulating film 743 is formed of an organic-based insulating material such as polyimide resin, and the other insulating films (the insulating film 741, the insulating film 742, and the insulating film 744) are formed of an inorganic-based insulating material such as silicon nitride and silicon oxide.

The contact 90H formed of conductive metal is formed in a so-called contact hall to couple the drain electrode 90 and the second electrode 32. The first electrode 31 being the common electrode COM is supplied with the common potential commonly given to the pixels. The first electrode 31 and the second electrode 32 are translucent electrodes each formed of a translucent conductive material (translucent conductive oxide) such as indium tin oxide (ITO).

Figure 5:
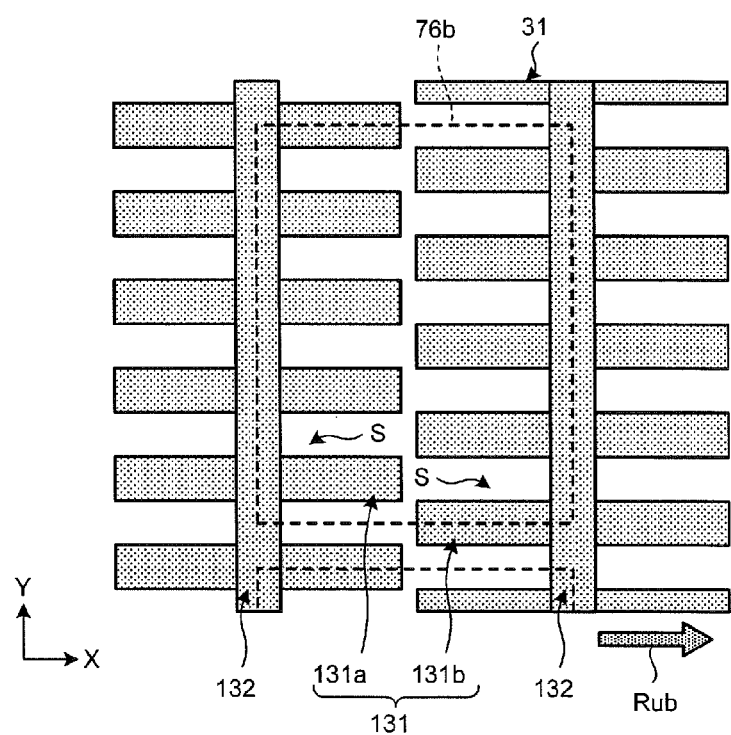
FIG. 5 is a schematic diagram for explaining a relation between a shape of a first electrode and an opening according to the first embodiment.

FIG. 5 is a schematic diagram for explaining a relation between a shape of the first electrode and an opening according to the first embodiment. As illustrated in FIG. 5, the first electrode 31 is formed into a comb shape by slits S each of which is an area without the conductive material. The first electrode 31 has a plurality of comb-shaped portions 131 protruding from electrode base portions 132 that extend in a Y direction. The comb-shaped portions 131 include comb-shaped portions 131a and comb-shaped portions 131b which extend from the electrode base portions 132 in opposite directions to each other. A plurality of comb-shaped portions 131a protrude from each electrode base portion 132 at a fixed distance away from each other. Likewise, a plurality of comb-shaped portions 131b protrude from each electrode base portion 132 at a fixed distance away from each other. From each electrode base portions 132, the comb-shaped portions 131a extend in an X direction and the comb-shaped portions 131b extend in the opposite direction to the X direction. The electrode base portions 132 are formed of a translucent conductive material (translucent conductive oxide) such as ITO, as well as the comb-shaped portions 131a and of the comb-shaped portions 131b.

The first orientation film 73a is subjected to a rubbing process in a rubbing direction Rub (first rubbing direction, first orientation direction) illustrated in FIG. 3 and FIG. 5 so as to have predetermined initial orientation characteristics in the X direction. The second orientation film 73b is subjected to a rubbing process in an antiparallel direction (second rubbing direction, second orientation direction) to the rubbing direction Rub of the first orientation film 73a. The rubbing directions (orientation directions) of the first orientation film 73a and the second orientation film 73b are antiparallel to each other. As explained above, the comb-shaped portions 131a extend in the X direction, the comb-shaped portions 131b extend in the opposite direction to the X direction, and the rubbing direction Rub is parallel to the extending direction of the comb-shaped portion 131a or of the comb-shaped portion 131b. The "parallel" mentioned here has only to be parallel to such an extent that a rotation direction LCQ of liquid crystal molecules Lcm illustrated in FIG. 9, explained later, can be maintained. More specifically, the extent includes a manufacturing error which is 0 degrees to 0.5 degrees. In the present embodiment, the first orientation film 73a and the second orientation film 73b so as to have the predetermined initial orientation characteristics are subjected to a rubbing process. However, it is not limited for the first orientation film 73a and the second orientation film 73b to have the predetermined initial orientation characteristics. Instead of the rubbing process, the first orientation film 73a and the second orientation film 73b can be formed of materials with photo-orientation characteristics to have the predetermined initial orientation characteristics.

Figure 6:
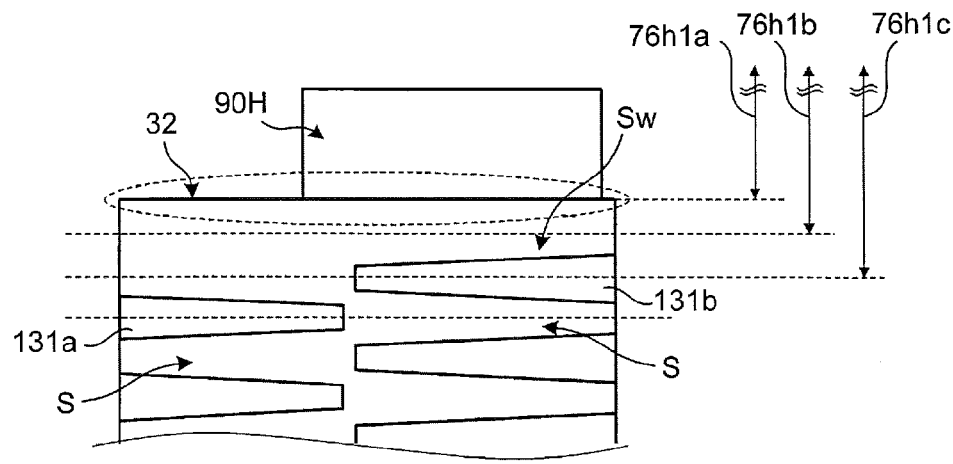
FIG. 6 is a schematic diagram for explaining a relation between the shape of the first electrode and a light blocking position according to the first embodiment.

FIG. 6 is a schematic diagram for explaining a relation between the shape of the first electrode and a light blocking position according to the first embodiment. The black matrix 76a has only to block light up to the position of a width 76h1a illustrated in FIG. 6 to hide the contact 90H. An electric field in an outermost slit Sw between the comb-shaped portion 131b near the edge of the opening 76b and the contact 90H is different in distribution from an electric field applied to the slit S between adjacent comb-shaped portions 131a or between adjacent comb-shaped portions 131b. Therefore, if the black matrix 76a blocks the light up to the position of a width 76h1b illustrated in FIG. 6 and hides the contact 90H and a half or more of the outermost slit Sw, a change rate of a transmittance of the outermost slit Sw and that of the slit S can be made close to each other. If the black matrix 76a blocks the light up to the position of a width 76h1c illustrated in FIG. 6 and hides the contact 90H and the outermost slit Sw, a difference between the change rates of the transmittance of the outermost slit Sw and of the slit S does not have to be considered. These structures enable the luminance in the opening 76b to be made uniform.

Figure 7:
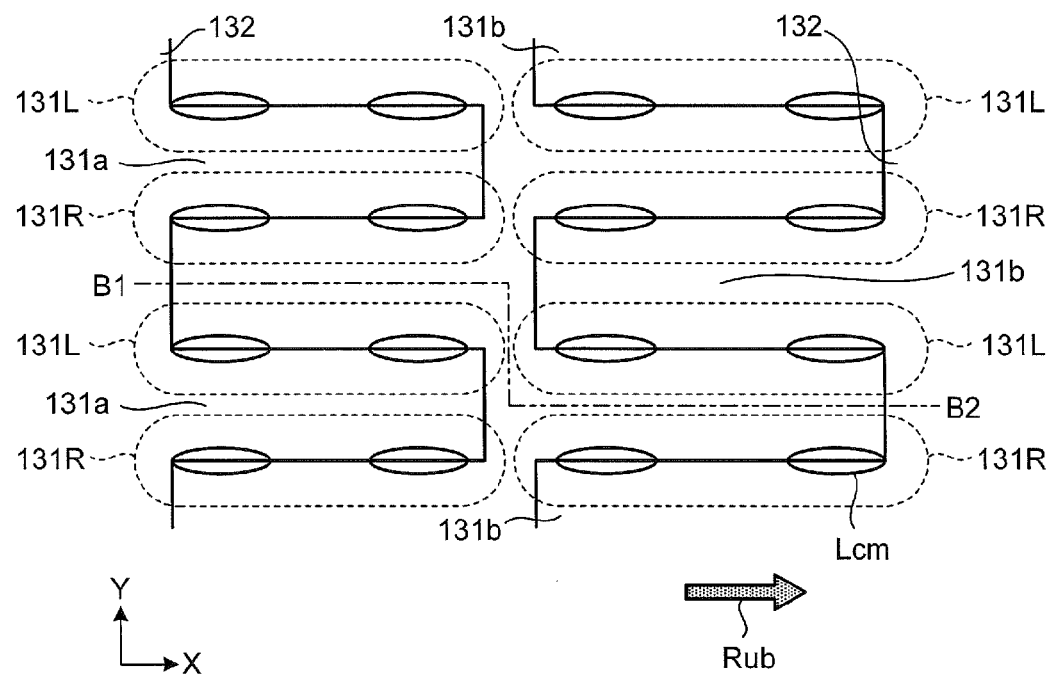
FIG. 7 is an explanatory diagram for explaining an orientation of the liquid crystal when a voltage for generating an electric field between the first electrode and the second electrode is not applied therebetween in the liquid crystal display device according to the first embodiment.
Figure 8:
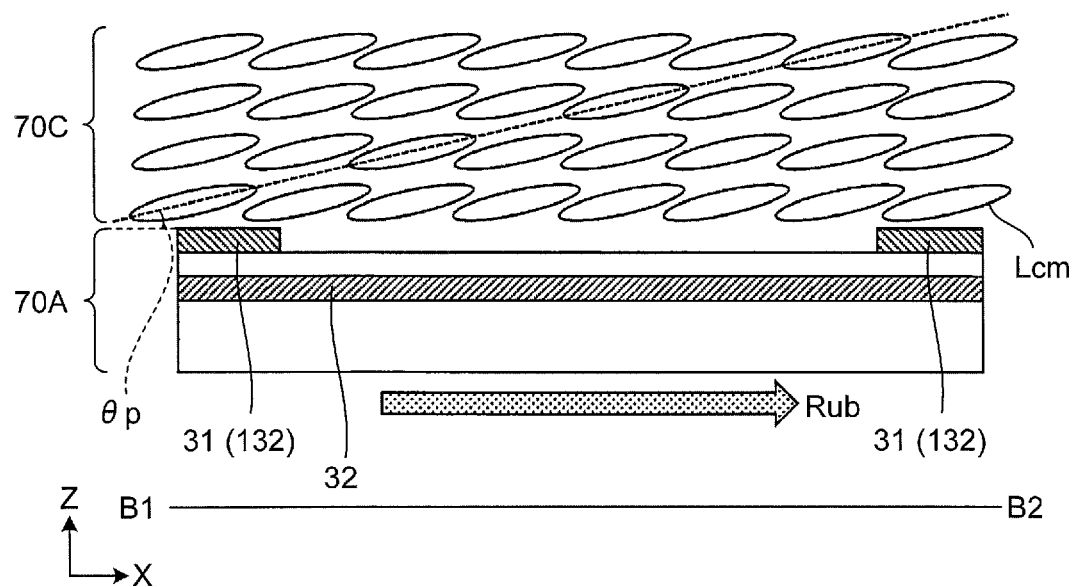
FIG. 8 is a schematic diagram of a cross section of line B1-B2 in FIG. 7.
Figure 9:
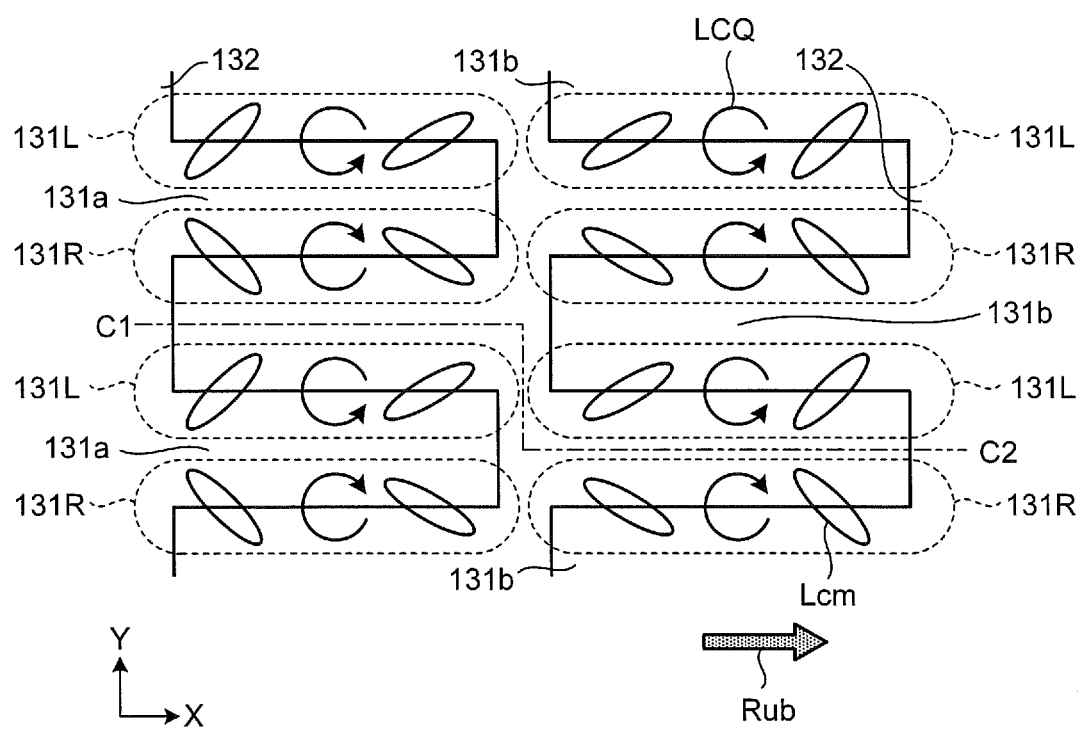
FIG. 9 is an explanatory diagram for explaining an orientation of the liquid crystal when a voltage for generating an electric field between the first electrode and the second electrode is applied therebetween in the liquid crystal display device according to the first embodiment.
Figure 10:
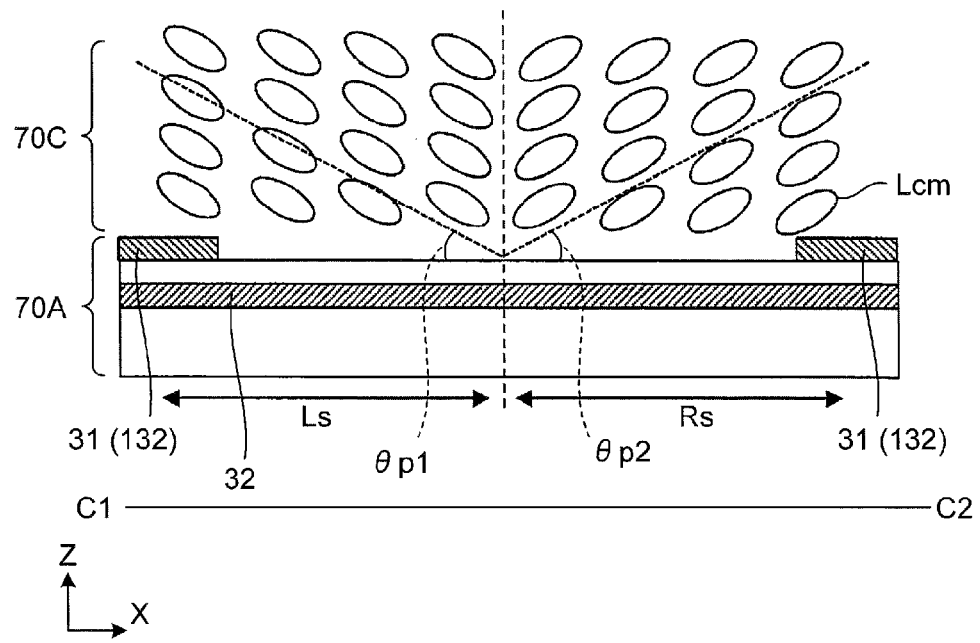
FIG. 10 is a schematic diagram of a cross section of line C1-C2 in FIG. 9.
Figure 11:
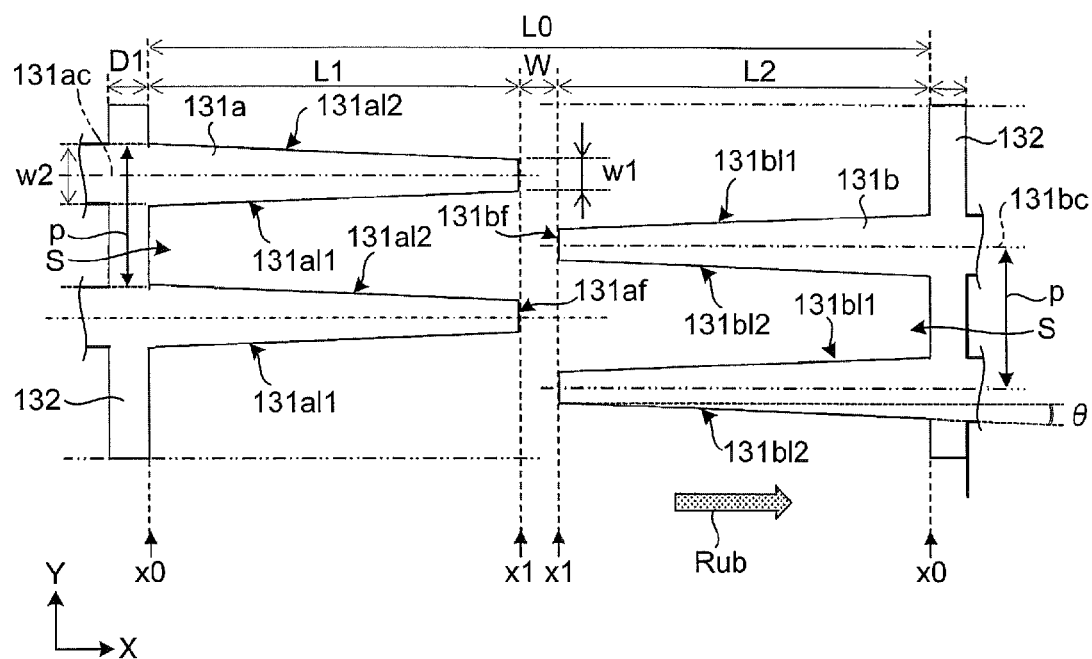
FIG. 11 is a schematic diagram for explaining in detail a shape of the first electrode according to the first embodiment.

FIG. 7 is an explanatory diagram for explaining an orientation of the liquid crystal when a voltage for generating an electric field between the first electrode and the second electrode is not applied therebetween in the liquid crystal display device according to the first embodiment. FIG. 8 is a schematic diagram of a cross section of line B1-B2 in FIG. 7. FIG. 9 is an explanatory diagram for explaining an orientation of the liquid crystal when a voltage for generating an electric field between the first electrode and the second electrode is applied therebetween in the liquid crystal display device according to the first embodiment. FIG. 10 is a schematic diagram of a cross section of line C1-C2 in FIG. 9. FIG. 11 is a schematic diagram for explaining in detail a shape of the first electrode according to the first embodiment.

As explained above, the first orientation film 73a is subjected to the rubbing process in the rubbing direction Rub illustrated in FIG. 3 and FIG. 5 so as to have the predetermined initial orientation characteristics in the X direction. Therefore, as illustrated in FIG. 7, when a voltage for generating an electric field between the first electrode 31 and the second electrode 32 is not applied therebetween, long-axis directions of liquid crystal molecules Lcm in the liquid crystal layer 70C are likely to be aligned in parallel to the extending directions of the comb-shaped portion 131a and the comb-shaped portion 131b. Therefore, the liquid crystal molecules Lcm are initially oriented along a direction parallel to the extending directions of the comb-shaped portion 131a and the comb-shaped portion 131b in areas near a right long side 131R and a left long side 131L of the comb-shaped portion 131a and the comb-shaped portion 131b, respectively, which face each other in a width direction of the slit S. Furthermore, the liquid crystal molecules Lcm illustrated in FIG. 8 are aligned along the rubbing direction Rub and are initially oriented upward toward the rubbing direction Rub so as to have a pre-tilt angle $\theta$p with respect to the surface of the TFT substrate 71.

As illustrated in FIG. 9, when a voltage for generating an electric field between the first electrode 31 and the second electrode 32 is applied therebetween, the liquid crystal molecules Lcm rotate in liquid crystal rotation directions LCQ. In other words, the liquid crystal rotation direction LCQ indicates a direction of twisting or of rotating the liquid crystal on an X-Y plane. The liquid crystal molecules Lcm in the area near the right long side 131R and in the area near the left long side 131L undergo electric fields opposite to each other to easily rotate in opposite directions.

In this way, in the liquid crystal layer 70C of the display device 1 according to the first embodiment, when a voltage is applied between the first electrode 31 and the second electrode 32, the liquid crystal molecules Lcm rotate in opposite directions to each other in the area near the right long side 131R being one side of the adjacent comb-shaped portions 131a (131b) that face each other in the width direction of the slit S and in the area near the left long side 131L being the other side thereof. Therefore, as compared with the display device in the FFS mode described in JP-A-2008-52161, in the display device 1 according to the first embodiment, the liquid crystal molecules Lcm react more quickly to the change in the electric field between the first electrode 31 and the second electrode 32. Accordingly, the display device 1 according to the first embodiment achieves an improved response speed.

The response speed is a speed at which a transmittance of the liquid crystal is shifted between predetermined levels when the voltage is applied between the first electrode 31 and the second electrode 32. In other words, the response speed is defined by a time required for transition from the state in which the voltage is not applied (e.g., transmittance=0) to the state in which the voltage is applied (transmittance=1) or required for its reverse transition.

When a voltage for generating an electric field between the first electrode 31 and the second electrode 32 is applied therebetween, the long-axis directions of the liquid crystal molecules Lcm also change in the Z direction, as illustrated in FIG. 10, while rotating within a plane (X-Y plane) parallel to the surface of the pixel substrate 70A (TFT substrate 71). The first electrode 31 and the second electrode 32 are arranged opposite to each other in a direction perpendicular to the surface of the pixel substrate 70A (TFT substrate 71), and therefore the electric field generated between the first electrode 31 and the second electrode 32 becomes a fringe electric field that passes through the slit S. The fringe electric field causes the long axes of the liquid crystal molecules Lcm to rise in the direction perpendicular (Z direction) to the surface of the pixel substrate 70A (TFT substrate 71) while rotating in liquid crystal rotation directions LCQ (clockwise rotation, counterclockwise rotation) on the X-Y plane illustrated in FIG. 9. The orientations of the liquid crystal rotation directions LCQ may be mixed in the center area of the slit S.

As illustrated in FIG. 10, the long-axis direction of the liquid crystal molecules Lcm is inclined by an angle $\theta$p2 that is greater than the pre-tilt angle $\theta$p in a slit area Rs between the comb-shaped portions 131b. In a slit area Ls between the comb-shaped portions 131a, the long-axis direction of the liquid crystal molecules Lcm is inclined by an angle $\theta$p1 in an opposite direction to the pre-tilt angle $\theta$p. The slit area Ls is harder for the long-axis direction of the liquid crystal molecules Lcm to rise therein than the slit area Rs, and is likely inferior in responsiveness.

As illustrated in FIG. 11, the display device 1 according to the first embodiment more finely defines the shape of the first electrode 31 to thereby improve the responsiveness. For example, as illustrated in FIG. 11, a total slit length between the electrode base portions 132 in the X direction is set as L0. A comb protruded length of the comb-shaped portion 131a in the X direction is set as L1. The comb protruded length L1 is a length from a position x1 of a tip 131af of the comb-shaped portion 131a to a protrusion start position x0 of the electrode base portion 132. Likewise, a comb protruded length of the comb-shaped portion 131b in the X direction is set as L2. The comb protruded length L2 is a length from a position x1 of a tip 131bf of the comb-shaped portion 131b to the protrusion start position x0 of the electrode base portion 132. Each width in the Y direction of the tip 131af of the comb-shaped portion 131a and of the tip 131bf of the comb-shaped portion 131b is set as w1. The total slit length L0 is preferably, for example, 10 µm to 60 µm. The total slit length L0 is more preferably less than 40 µm, for example, 20 µm. The display device 1 according to the first embodiment has higher orientation stability of the liquid crystal if the total slit length L0 is made shorter, and has higher luminance if the total slit length L0 is made longer.

As explained above, the slit area Ls illustrated in FIG. 10 is harder for the long-axis direction of the liquid crystal molecules Lcm to rise therein than the slit area Rs, and is likely inferior in responsiveness. To make the slit area Ls smaller than the slit area Rs, the comb protruded length L1 illustrated in FIG. 11 is made smaller than the comb protruded length L2 of the comb-shaped portion 131b on the downstream side in the rubbing direction Rub than the comb-shaped portion 131a. This enables the display device 1 according to the first embodiment to enhance the response speed.

The width w1 in the Y direction of the tip 131af of the comb-shaped portion 131a and of the tip 131bf of the comb-shaped portion 131b is set to, for example, 2 µm to 5 µm, and a narrower one allows further enhancement of the response speed.

An array pitch (slit pitch) p of adjacent comb-shaped portions 131a is the same as an array pitch of adjacent comb-shaped portions 131b. Furthermore, the tip 131af of the comb-shaped portion 131a and the tip 131bf of the comb-shaped portion 131b are alternately arranged in the Y direction. With this structure, as illustrated in FIG. 9, the right long side 131R of the comb-shaped portion 131a and the right long side 131R of the comb-shaped portion 131b are aligned in the X direction. In addition, with this structure, as illustrated in FIG. 9, the left long side 131L of the comb-shaped portion 131a and the left long side 131L of the comb-shaped portion 131b are aligned in the X direction. As a result, the liquid crystal rotation directions LCQ in which the liquid crystal molecules Lcm rotate are oriented toward the same direction when viewed in the X direction, and behaviors of the liquid crystal molecules Lcm that rotate are thereby stabilized. If the array pitch p is narrower, the response speed becomes higher, and therefore the array pitch p is preferably smaller than 9 µm.

A gap between the tip 131af of the comb-shaped portion 131a and the tip 131bf of the comb-shaped portion 131b illustrated in FIG. 11 is a width W in the X direction of a communicating opening that extends in the Y direction, and a narrower one is preferable. For example, the width W in the X direction of the communicating opening is equal to or less than 7 µm. The width W in the X direction of the communicating opening is more preferably equal to or less than 4 µm. The width W in the X direction of the communicating opening can be also set to 0 or less. For example, when W is 0, the tip 131af of the comb-shaped portion 131a and the tip 131bf of the comb-shaped portion 131b are aligned in line in the Y direction with a gap in the Y direction between the tips, and a plurality of slits S have such a form that the slits S are communicatively opened. Alternatively, when W is less than 0, the tip 131af of the comb-shaped portion 131a and the tip 131bf of the comb-shaped portion 131b have a form in which the tips enter into respective adjacent slits S in the X direction, in other words, the comb-shaped portion 131a and the comb-shaped portion 131b have a form in which both of them are alternately intruded into the adjacent slits.

The comb-shaped portion 131a has a width w2 in the Y direction at the protrusion start position x0 of the electrode base portion 132, which is wider than the width w1 in the Y direction of the tip 131af of the comb-shaped portion 131a. Therefore, the comb-shaped portion 131a is formed into a trapezoidal shape. Because of this, a long side 131a/1 and a long side 131a/2 of the comb-shaped portion 131a are oblique sides each of which is inclined by an angle θ with respect to an imaginary line 131ac (corresponding to X direction along which the comb-shaped portion 131a extends) that passes through the center of the comb-shaped portion 131a. When the angle θ is greater than 0.5 degrees, the liquid crystal rotation directions LCQ in which the liquid crystal molecules Lcm rotate are easily regulated, and the behaviors of the liquid crystal molecules Lcm thereby stabilize.

Likewise, the comb-shaped portion 131b has a width w2 in the Y direction at the protrusion start position x0 of the electrode base portion 132, which is wider than the width w1 in the Y direction of the tip 131bf of the comb-shaped portion 131b. Therefore, the comb-shaped portion 131b is formed into a trapezoidal shape. Because of this, a long side 131b/1 and a long side 131b/2 of the comb-shaped portion 131b are oblique sides each of which is inclined by an angle θ with respect to an imaginary line 131bc (corresponding to X direction along which the comb-shaped portion 131b extends) that passes through the center of the comb-shaped portion 131b. When the angle θ is greater than 0.5 degrees, the liquid crystal rotation directions LCQ in which the liquid crystal molecules Lcm rotate are easily regulated, and the behaviors of the liquid crystal molecules Lcm thereby stabilize. In this way, the display device 1 according to the first embodiment achieves high orientation stability because the liquid crystal rotation directions are regulated in the adjacent columns in the X direction and along the line in the X direction.

When the comb protruded length L1 of the comb-shaped portion 131a or the comb protruded length L2 of the comb-shaped portion 131b is made longer, the angle θ needs to be made greater. An increase in the angle causes a difference between the width w1 and the width w2 to increase, and the array pitch p is thereby restricted. For example, when the angle θ is in the range of 0.5 degrees to 1.0 degrees, the comb protruded length L1 of the comb-shaped portion 131a or the comb protruded length L2 of the comb-shaped portion 131b is preferably equal to or less than 45 µm.

The electrode base portion 132 does not so much contribute to light transmission, and therefore a width D1 of the electrode base portion 132 in the X direction (direction perpendicular to the extending direction of the electrode base portion 132) is preferably narrow. The width D1 is preferably greater than 0 µm and not greater than 4 µm. When the width D1 is greater than 0 µm, its conductivity can be improved. When the width D1 is not greater than 4 µm, degradation of the transmittance can be suppressed. When the width D1 is greater than 0 µm and not greater than 4 µm and the comb protruded length L1 of the comb-shaped portion 131a or the comb protruded length L2 of the comb-shaped portion 131b is equal to or less than 45 µm, the display area 21 can achieve a high definition screen having 160 ppi (pixel per inch) or more. In this case, for example, when the width w1 is 0.5 µm, the width w2 is preferably equal to or greater than 1 µm in order to keep quality over the whole areas of the comb protruded length L1 of the comb-shaped portion 131a and the comb protruded length L2 of the comb-shaped portion 131b.

As explained above, a narrower array pitch p enables the response speed to be increased. However, when the array pitch p is made narrower, for example, the widths in the Y direction of the comb-shaped portion 131a and of the comb-shaped portion 131b become relatively wider, which results in an increase in the area that does not so much contribute to light transmission. Therefore, in the comb-shaped portion 131a and in the comb-shaped portion 131b according to the first embodiment, the width w2 in the Y direction at the protrusion start position x0 of the electrode base portion 132 is smaller than a number obtained by multiplying the array pitch p of adjacent comb-shaped portions 131a or of adjacent comb-shaped portions 131b by 0.5. With this structure, the degradation of the maximum transmittance at which the light transmits the pixel Vpix can be suppressed even if the width w2 in the Y direction fluctuates depending on conditions under which the comb-shaped portion 131a and the comb-shaped portion 131b are manufactured. Moreover, the degradation of the maximum transmittance at which the light transmits the pixel Vpix can be suppressed even if the array pitch p fluctuates depending on conditions under which the comb-shaped portion 131a and the comb-shaped portion 131b are manufactured.

The comb-shaped portion 131a and the comb-shaped portion 131b according to the first embodiment may be configured such that the width w2 in the Y direction at the protrusion start position x0 of the electrode base portion 132 is smaller than a number obtained by multiplying the array pitch p of adjacent comb-shaped portions 131*a* or of adjacent comb-shaped portions 131*b* by 0.45. With this structure, the width w2 in the Y direction can be set to a width with which the fluctuation of the transmittance is small with respect to a voltage to be applied to the comb-shaped portion 131*a* and the comb-shaped portion 131*b*. As a result, even if the width w2 in the Y direction fluctuates, the degradation of the maximum transmittance at which the light transmits the pixel Vpix is decreased with respect to the comb-shaped portion 131*a* and the comb-shaped portion 131*b* to which the same voltage is applied.

Manufacturing Method

A method of manufacturing the display device 1 according to the first embodiment includes, for example, the following processes. A manufacturing system processes a first substrate preparing step of preparing a glass substrate being a translucent substrate as the TFT substrate 71 of the pixel substrate (first substrate) 70A.

Subsequently, the manufacturing system forms the scan line 24*m* and the gate electrode 93 on the TFT substrate 71. The manufacturing system then forms the insulating film 741 to be located between the scan line 24*m*/the gate electrode 93 and the semiconductor layer 92 over the TFT substrate 71. Then the manufacturing system forms layers such as the source electrode 91, the drain electrode 90, and the semiconductor layer 92. The manufacturing system forms the insulating film 742 to be located between the semiconductor layer 92 and the data line 25*n*. The manufacturing system forms the data line 25*n* and couples the data line 25*n* to the source electrode 91. The manufacturing system then forms the insulating film 743 to be located between the data line 25*n* and the second electrode 32.

Subsequently, the manufacturing system forms the second electrode 32 being the pixel electrode by sputtering, etching, or so, and couples the drain electrode 90 and the second electrode 32 via the conductive contact 90H. The thickness of the second electrode 32 is, for example, 10 nm to 100 nm. The manufacturing system then forms the insulating film 744 on the second electrode 32 using a plasma chemical vacuum deposition (CVD) method or the like.

The manufacturing system forms the first electrode 31 being the common electrode COM by sputtering, etching, or so. The thickness of the first electrode 31 is, for example, 10 nm to 100 nm. The first electrode 31 is formed into a comb shape by the slits S. The manufacturing system forms the first orientation film 73*a*, on the first electrode 31, in which a polymeric material such as polyimide is subjected to a process in the rubbing direction Rub. In this manner, the manufacturing system processes a first substrate manufacturing step.

The manufacturing system processes a second substrate preparing step of preparing a glass substrate being a translucent substrate as the glass substrate 72 of the counter substrate (second substrate) 70B.

The manufacturing system forms the layer including the color filters 76R, 76G, and 76B, and the black matrix 76*a* on the glass substrate 72 and forms an overcoat layer or so on top of the layer. The manufacturing system forms the second orientation film 73*b*, on the overcoat layer, in which a polymeric material such as polyimide is subjected to a process in an antiparallel direction (opposite direction) to the rubbing direction Rub. In this manner, the manufacturing system processes a second substrate manufacturing step.

The manufacturing system causes the pixel substrate 70A and the counter substrate 70B to face each other, injects liquid crystal into between the two, and seals the liquid crystal by using a frame part to form the liquid crystal layer 70C. A polarizer, a backlight, and the like are attached to the rear side of the pixel substrate 70A, and a polarizer and the like are attached to the front side of the counter substrate 70B. The driver IC 3 is coupled to an electrode edge of the frame part, and the display device 1 is thus manufactured.

In the first embodiment, the amorphous silicon (a-Si) is used as the semiconductor layer 92 forming the TFT element Tr; however, the embodiment is not limited thereto. Polysilicon (poly-Si) may be used as the semiconductor layer 92. Alternatively, other semiconductor materials (e.g., germanium (Ge)) may be used instead of silicon or any material obtained by adding other materials to silicon (e.g., silicon germanium (SiGe)) may be used. Furthermore, an oxide semiconductor material may be used as the semiconductor layer 92. As the oxide semiconductor material, for example, an oxide semiconductor material including indium (In) may be used.

In the first embodiment, the TFT element Tr is a bottom gate type TFT in which the gate electrode 93 is provided below the semiconductor layer 92. However, if possible, the TFT element Tr may use a structure of a top gate type TFT in which the gate electrode 93 is provided above the semiconductor layer 92.

First Modification of First Embodiment

Figure 12:
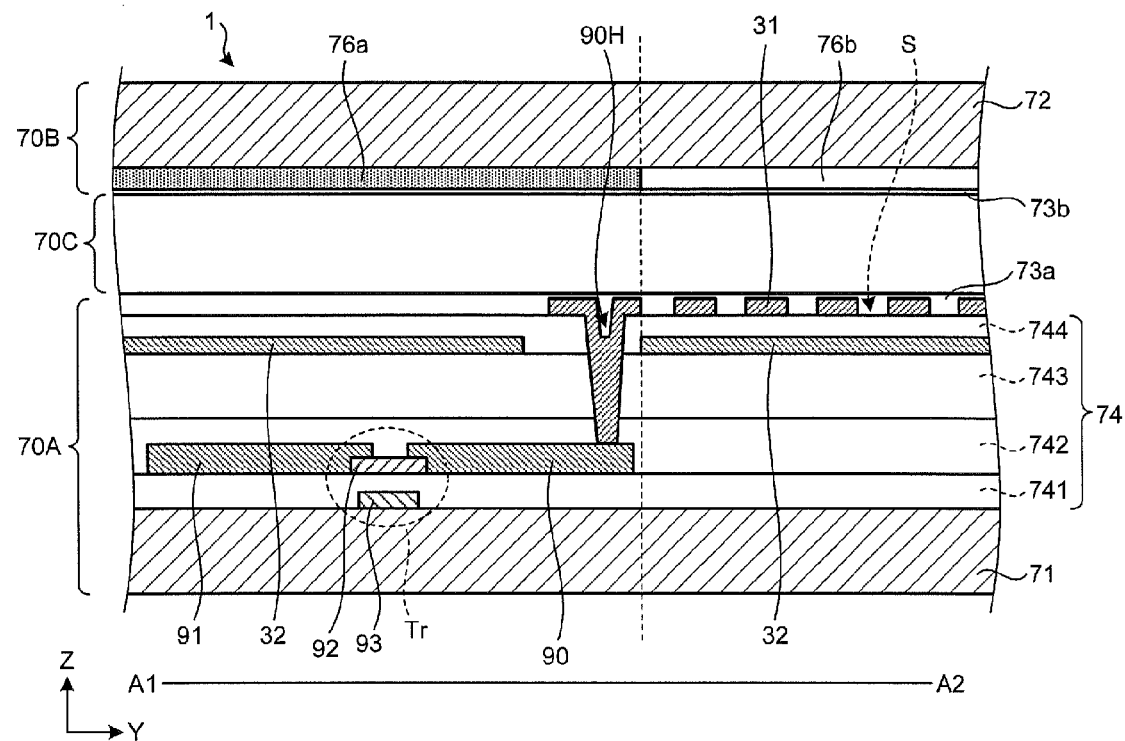
FIG. 12 is a schematic diagram of a modification of the cross section of line A1-A2 in FIG. 3.

A display device 1 according to a first modification of the first embodiment will be explained below. FIG. 12 is a schematic diagram of a modification of the cross section of line A1-A2 in FIG. 3. The same letters or numerals are assigned to the same components as these explained in the first embodiment, and overlapping explanation is therefore not repeated.

The display device 1 according to the first modification of the first embodiment is configured to generate an electric field (horizontal electric field) and in a direction parallel to the TFT substrate 71 between the first electrode 31 and the second electrode 32 which are layered in a direction (Z direction) perpendicular to the surface of the TFT substrate 71 of the pixel substrate 70A, to thereby rotate the liquid crystal molecules of the liquid crystal layer 70C in plane parallel to the substrate surface, and to perform display using a change in the light transmittance corresponding to the rotation of the liquid crystal molecules. For example, the second electrode 32 illustrated in FIG. 12 is the common electrode COM and the first electrode 31 is the pixel electrode. The first electrode 31 is coupled to the drain electrode 90 via, for example, the conductive contact 90H. The first electrode 31 has an independent pattern which is partitioned for each area of the pixel Vpix and is insulated from the first electrode 31 in the area of the adjacent pixel Vpix.

Second Modification of First Embodiment

Figure 13:
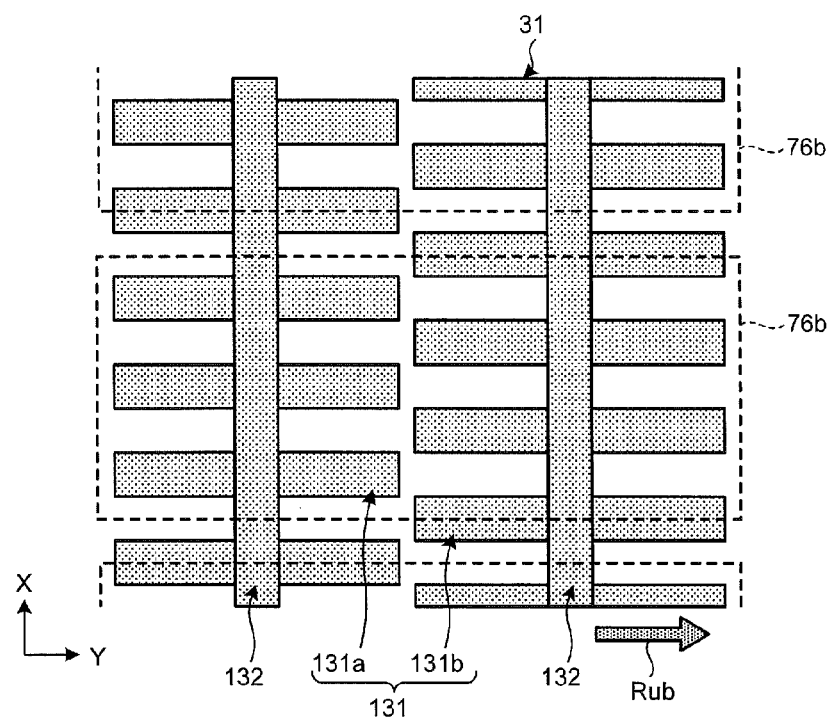
FIG. 13 is a schematic diagram for explaining a modification of the relation between the shape of the first electrode and the opening according to the first embodiment.

A display device 1 according to a second modification of the first embodiment will be explained below. FIG. 13 is a schematic diagram for explaining a modification of the relation between the shape of the first electrode and the opening according to the first embodiment. The same letters or numerals are assigned to the same components as these explained in the first embodiment, and overlapping explanation is therefore not repeated.

The first electrode 31 has the comb-shaped portions 131 protruding from the electrode base portion 132 that extends in the X direction. The comb-shaped portions 131 include the comb-shaped portions 131*a* and the comb-shaped portions 131*b* that extend from the electrode base portions 132 in opposite directions. A plurality of comb-shaped portions 131a protrude from each electrode base portion 132 at a fixed distance away from each other. Likewise, a plurality of comb-shaped portions 131b protrude from each electrode base portion 132 at a fixed distance away from each other. From each electrode base portion 132, the comb-shaped portions 131a extend in the Y direction and the comb-shaped portions 131b extend in the opposite direction to the Y direction.

Therefore, the first orientation film 73a is subjected to the rubbing process in the rubbing direction Rub illustrated in FIG. 13 so as to have predetermined initial orientation characteristics in the Y direction. The second orientation film 73b is subjected to the rubbing process in an antiparallel direction to the rubbing direction Rub of the first orientation film 73a. The rubbing directions of the first orientation film 73a and the second orientation film 73b are antiparallel to each other. Further, the rubbing process may be replaced with other orientation process such as the photo-orientation process, as described above.

1-2. Second Embodiment

Figure 14:
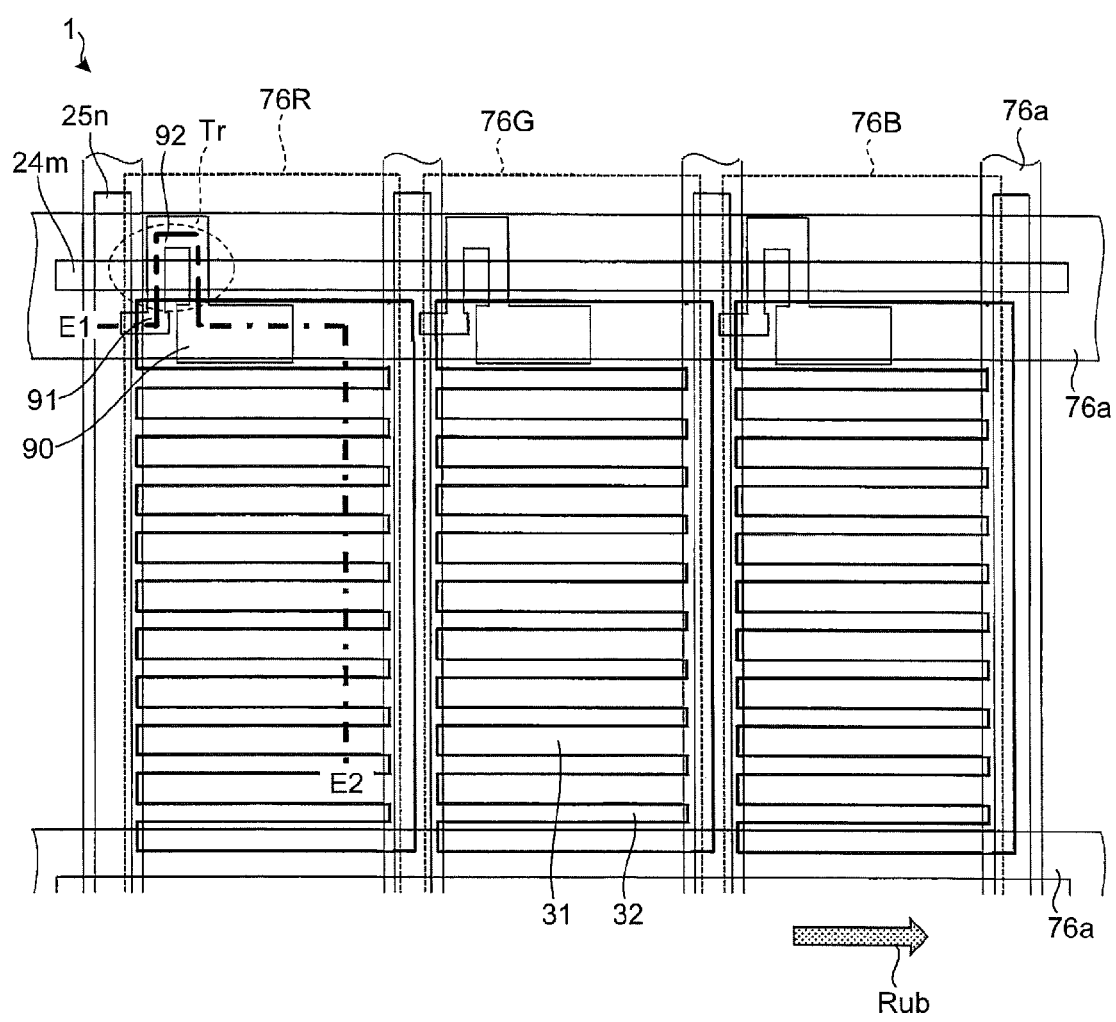
FIG. 14 is a plan view for explaining pixels of a liquid crystal display device according to a second embodiment.
Figure 15:
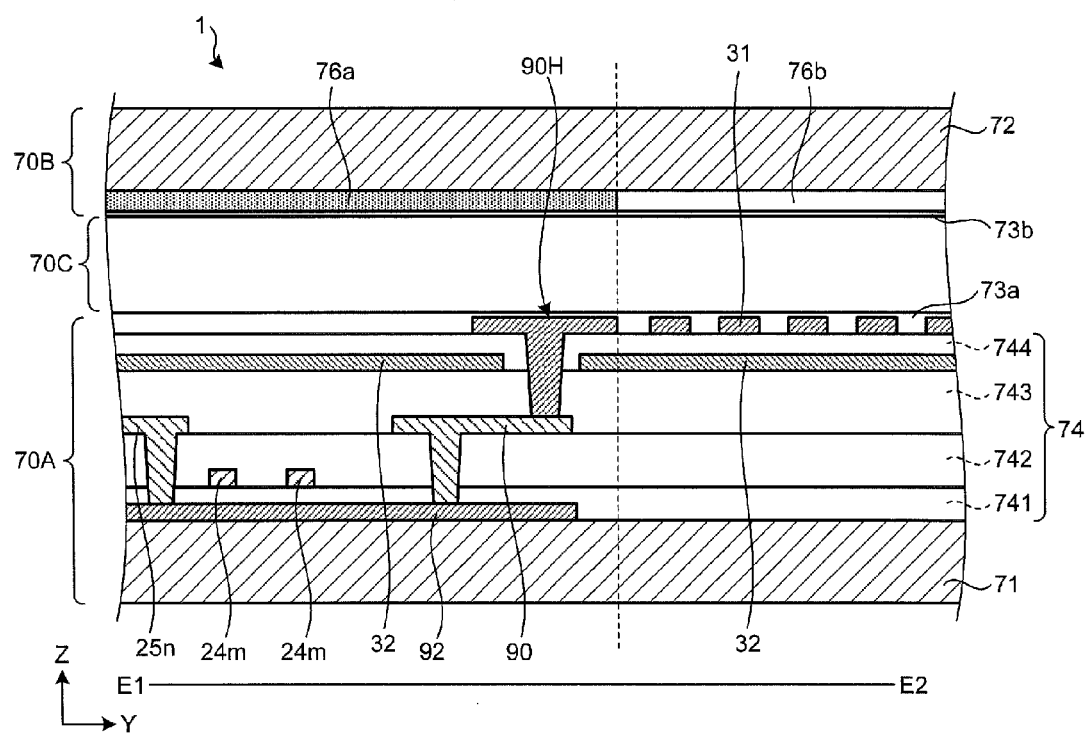
FIG. 15 is a schematic diagram of a cross section of line E1-E2 in FIG. 14.
Figure 16:
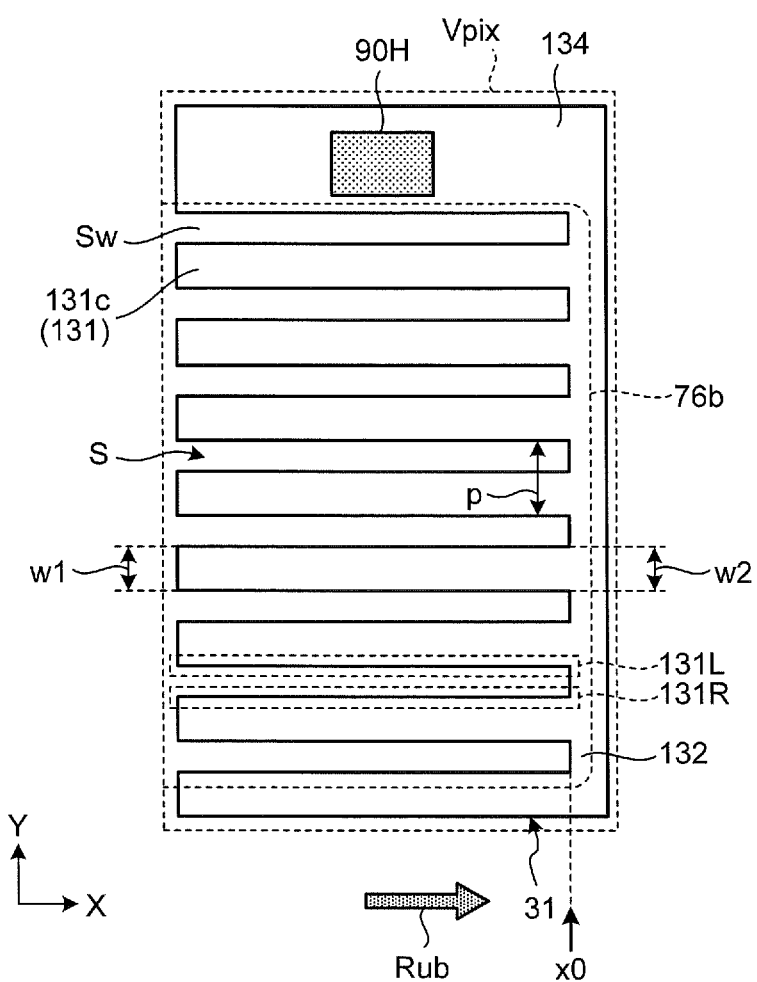
FIG. 16 is a schematic diagram for explaining a relation between a shape of a first electrode and an opening according to the second embodiment.

A display device 1 according to a second embodiment will be explained below. FIG. 14 is a plan view for explaining pixels of a liquid crystal display device according to the second embodiment. FIG. 15 is a schematic diagram of a cross section of line E1-E2 in FIG. 14. FIG. 16 is a schematic diagram for explaining a relation between a shape of a first electrode and an opening according to the second embodiment. The same letters or numerals are assigned to the same components as these explained in the first embodiment, and overlapping explanation is therefore not repeated.

As illustrated in FIG. 14, the semiconductor layer 92 is polysilicon (poly-Si) forming the TFT element Tr. The semiconductor layer 92 is a double-gate transistor forming a channel by two areas.

As illustrated in FIG. 14 and FIG. 15, the display device 1 according to the second embodiment is configured to generate an electric field (horizontal electric field) in the direction parallel to the TFT substrate 71 of the pixel substrate 70A between the first electrode 31 and the second electrode 32 which are layered in the direction (Z direction) perpendicular to the surface of the TFT substrate 71, to thereby rotate the liquid crystal molecules of the liquid crystal layer 70C in plane parallel to the substrate surface, and to perform display using a change in the light transmittance corresponding to the rotation of the liquid crystal molecules. For example, the second electrode 32 illustrated in FIG. 15 is the common electrode COM and the first electrode 31 is the pixel electrode. The first electrode 31 is coupled to the drain electrode 90 via, for example, the conductive contact 90H. The first electrode 31 has an independent pattern which is partitioned for each area of the pixels Vpix and is insulated from the first electrode 31 in the area of the adjacent pixel Vpix.

As illustrated in FIG. 16, the first electrode 31 is formed into a comb shape by the slits S each of which is an area without the conductive material. The first electrode 31 has a plurality of comb-shaped portions 131 protruding from an electrode base portion 132 that extends in the Y direction. The comb-shaped portions 131 include comb-shaped portions 131c which extend from the electrode base portion 132 in one direction, unlike the first embodiment. A plurality of comb-shaped portions 131c protrude from the electrode base portion 132 at a fixed distance away from each other. The electrode base portion 132 may have the comb-shaped portions 131c extending in the X direction as illustrated in FIG. 16, or may have the comb-shaped portions 131c extending in the opposite direction to the X direction.

The first orientation film 73a is subjected to the rubbing process in the rubbing direction Rub illustrated in FIG. 14 and FIG. 16 so as to have the predetermined initial orientation characteristics in the X direction. The second orientation film 73b is subjected to the rubbing process in the antiparallel direction to the rubbing direction Rub of the first orientation film 73a. The rubbing directions of the first orientation film 73a and the second orientation film 73b are antiparallel to each other. Further, the rubbing process may be replaced with other orientation process such as the photo-orientation process, as described above.

Similar to the display device 1 according to the first embodiment, in the liquid crystal layer 70C of the display device 1 according to the second embodiment, when a voltage is applied between the first electrode 31 and the second electrode 32, the liquid crystal molecules rotate in opposite directions to each other in the area near the right long side 131R being one side of the adjacent comb-shaped portions 131c that face each other in the width direction of the slit S and in the area near the left long side 131L being the other side thereof. Therefore, as compared with the display device in the FFS mode described in JP-A-2008-52161, in the display device 1 according to the second embodiment, the liquid crystal molecules react more quickly to the change in the electric field between the first electrode 31 and the second electrode 32. Accordingly, the display device 1 according to the second embodiment achieves an improved response speed.

When the comb protruded length of the comb-shaped portion 131c is made longer similarly to the comb protruded length L2 of the comb-shaped portion 131b, the angle θ needs to be made greater. An increase in the angle causes a difference between the width w1 and the width w2 to increase, and the array pitch p is thereby restricted. For example, when the angle θ is 0.5 degrees to 1.0 degrees, the comb protruded length of the comb-shaped portion 131c is preferably equal to or less than 45 μm.

The electrode base portion 132 does not so much contribute to light transmission, and therefore the width D1 of the electrode base portion 132 in the X direction (direction perpendicular to the extending direction of the electrode base portion 132) is preferably narrow. The width D1 is preferably greater than 0 μm and not greater than 4 μm. When the width D1 is greater than 0 μm, the conductivity can be improved. When the width D1 is not greater than 4 μm, the degradation of the transmittance can be suppressed. When the width D1 is greater than 0 μm and not greater than 4 μm and the comb protruded length of the comb-shaped portion 131c is equal to or less than 45 μm, the display area 21 can achieve a high definition screen having 160 ppi or more. In this case, for example, when the width w1 is 0.5 μm, the width w2 is preferably equal to or greater than 1 μm in order to keep quality over the whole areas of the comb protruded length of the comb-shaped portion 131c.

As explained above, a narrower array pitch p enables the response speed to be increased. However, when the array pitch p is made narrower, for example, the width in the Y direction of the comb-shaped portion 131c becomes relatively wider, which results in an increase in the area that does not so much contribute to light transmission. Therefore, in the comb-shaped portion 131c according to the second embodiment, the width w2 in the Y direction at the protrusion start position x0 of the electrode base portion 132 is smaller than a number obtained by multiplying the array pitch p of adjacent comb-shaped portions 131c by 0.5. With this structure, the degradation of the maximum transmittance at which the light transmits the pixel Vpix can be suppressed even if the width w2 in the Y direction fluctuates depending on conditions under which the comb-shaped portion 131c is manufactured. Moreover, the degradation of the maximum transmittance at which the light transmits the pixel Vpix can be suppressed even if the array pitch p fluctuates depending on conditions under which the comb-shaped portion 131c is manufactured.

The comb-shaped portion 131c according to the second embodiment may be configured such that the width w2 in the Y direction at the protrusion start position x0 of the electrode base portion 132 is smaller than a number obtained by multiplying the array pitch p of adjacent comb-shaped portions 131c by 0.45. With this structure, the width w2 in the Y direction can be set to a width with which the fluctuation of the transmittance is small with respect to a voltage to be applied to the comb-shaped portion 131c. As a result, even if the width w2 in the Y direction fluctuates, the degradation of the maximum transmittance at which the light transmits the pixel Vpix is decreased with respect to the comb-shaped portion 131c to which the same voltage is applied.

First Modification of Second Embodiment

Figure 17:
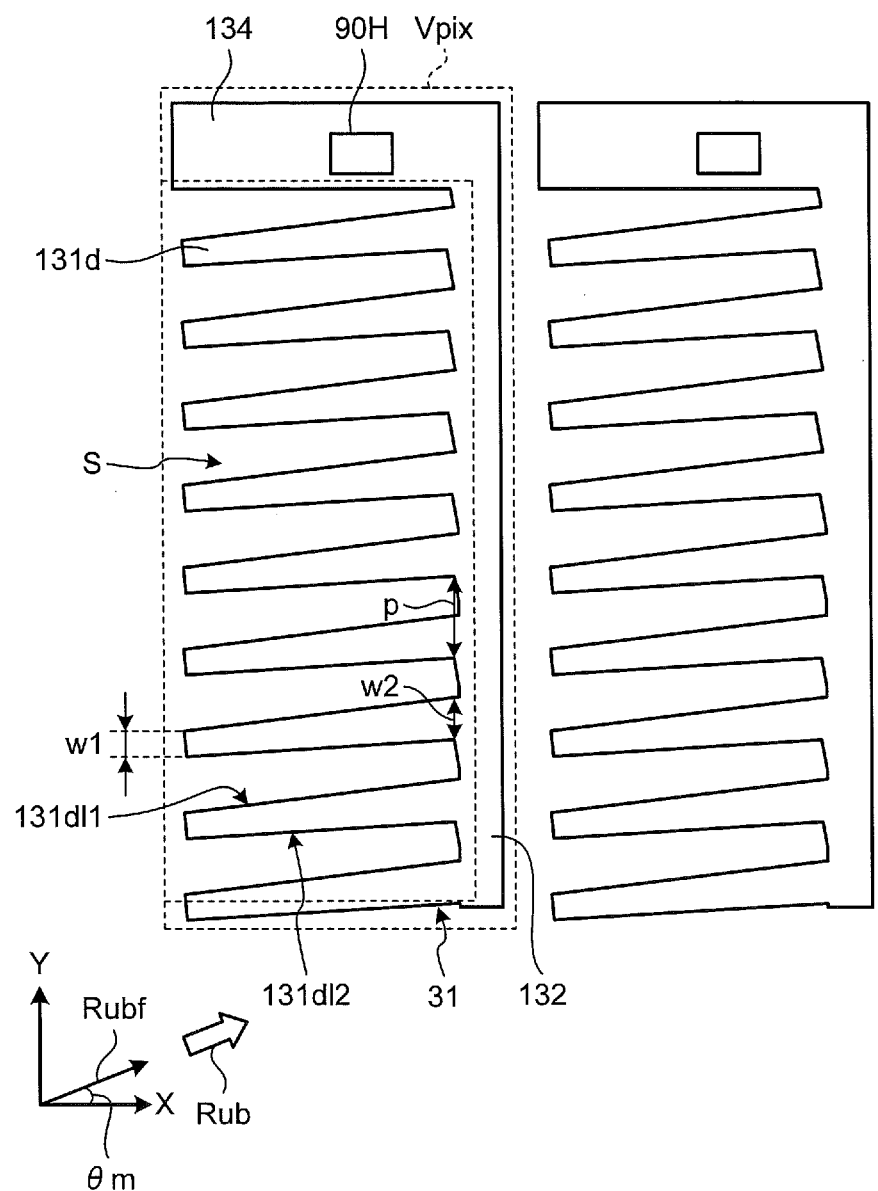
FIG. 17 is a schematic diagram for explaining a relation between a shape of a first electrode and an opening according to a first modification of the second embodiment.

A display device 1 according to a first modification of the second embodiment will be explained below. FIG. 17 is a schematic diagram for explaining a relation between a shape of a first electrode and an opening according to the first modification of the second embodiment. The same letters or numerals are assigned to the same components as these explained in the first embodiment and the second embodiment, and overlapping explanation is therefore not repeated.

The display device 1 according to the first modification of the second embodiment is configured to generate an electric field (horizontal electric field) in the direction parallel to the TFT substrate 71 of the pixel substrate 70A between the first electrode 31 and the second electrode 32 which are layered in the direction (Z direction) perpendicular to the surface of the TFT substrate 71, to thereby rotate the liquid crystal molecules of the liquid crystal layer 70C in plane parallel to the substrate surface, and to perform display using a change in the light transmittance corresponding to the rotation of the liquid crystal molecules. For example, the first electrode 31 illustrated in FIG. 17 is the pixel electrode, and the second electrode 32 is the common electrode COM. The first electrode 31 is coupled to the drain electrode 90 via, for example, the conductive contact 90H. The first electrode 31 has a plurality of comb-shaped portions 131d protruding from the electrode base portion 132 that extends in the Y direction. A plurality of comb-shaped portions 131d protrude from the electrode base portion 132 at a fixed distance away from each other. From the electrode base portion 132, the comb-shaped portions 131d extend along a direction Rubf. The direction Rubf along which the comb-shaped portions 131d extend has an angle θm with respect to the X direction (or the Y direction).

In the display device 1 according to the first modification of the second embodiment, one of the first electrode 31 and the second electrode 32 is the pixel electrode which is partitioned for each pixel Vpix. The pixel electrodes are arrayed in a matrix in the X direction and the Y direction. The direction Rubf along which the comb-shaped portions 131d extend is configured to be different from the direction where the pixel electrodes are arrayed in the row or in the column. Thus, even if the display area 21 of the display device 1 according to the first modification of the second embodiment is viewed using a polarized sunglass in order to facilitate visual recognition or to protect eyes, it is possible to suppress such a phenomena that most of the display area 21 is blocked by the polarized sunglass to cause the contrast to degrade and that the display thereby becomes dark and is difficult to see.

Second Modification of Second Embodiment

Figure 18:
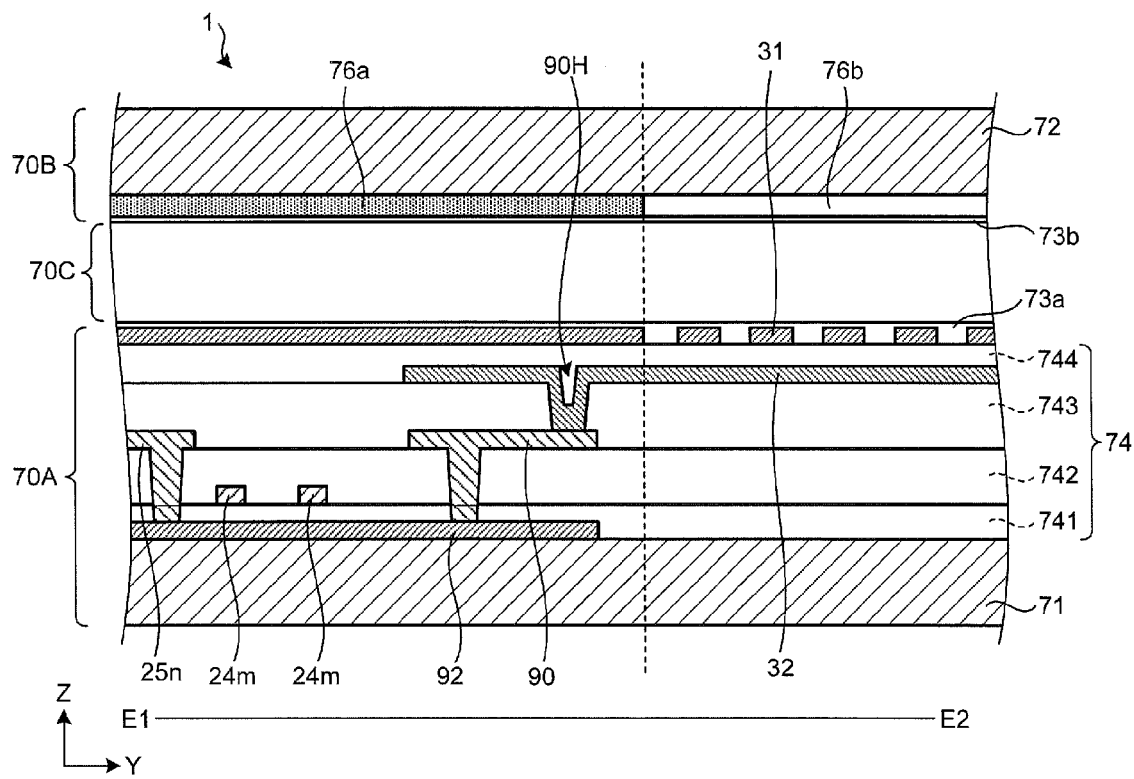
FIG. 18 is a schematic diagram of a modification of the cross section of line E1-E2 in FIG. 14.

A display device 1 according to a second modification of the second embodiment will be explained below. FIG. 18 is a schematic diagram of a modification of the cross section of line E1-E2 in FIG. 14. The same letters or numerals are assigned to the same components as these explained in the first embodiment and the second embodiment, and overlapping explanation is therefore not repeated.

The display device 1 according to the second modification of the second embodiment is configured to generate an electric field (horizontal electric field) in the direction parallel to the TFT substrate 71 of the pixel substrate 70A between the first electrode 31 and the second electrode 32 which are layered in the direction (Z direction) perpendicular to the surface of the TFT substrate 71, to thereby rotate the liquid crystal molecules of the liquid crystal layer 70C in plane parallel to the substrate surface, and to perform display using a change in the light transmittance corresponding to the rotation of the liquid crystal molecules. For example, the first electrode 31 illustrated in FIG. 18 is the common electrode COM, and the second electrode 32 is the pixel electrode. The second electrode 32 is coupled to the drain electrode 90 via, for example, the conductive contact 90H.

Third Modification of Second Embodiment

Figure 19:
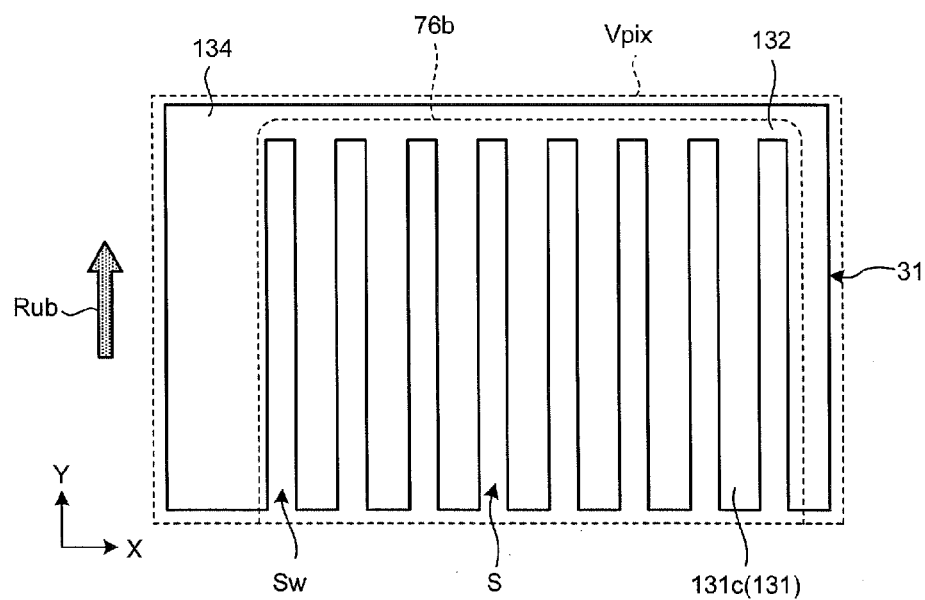
FIG. 19 is a schematic diagram for explaining a modification of the relation between the shape of the first electrode and the opening according to the second embodiment.

A display device 1 according to a third modification of the second embodiment will be explained below. FIG. 19 is a schematic diagram for explaining a modification of the relation between the shape of the first electrode and the opening according to the second embodiment. The same letters or numerals are assigned to the same components as these explained in the first embodiment and the second embodiment, and overlapping explanation is therefore not repeated.

The first electrode 31 has the comb-shaped portions 131 protruding from the electrode base portion 132 that extends in the X direction. The comb-shaped portion 131 includes the comb-shaped portions 131c that extend from the electrode base portions 132 in an opposite direction to the Y direction. A plurality of comb-shaped portions 131c protrude from the electrode base portion 132 at a fixed distance away from each other. From the electrode base portion 132, the comb-shaped portions 131c may extend in the Y direction.

Therefore, the first orientation film 73a is subjected to the rubbing process in the rubbing direction Rub illustrated in FIG. 19 so as to have the predetermined initial orientation characteristics in the Y direction. The second orientation film 73b is subjected to the rubbing process in the antiparallel direction to the rubbing direction Rub of the first orientation film 73a. The rubbing directions of the first orientation film 73a and the second orientation film 73b are antiparallel to each other. Further, the rubbing process may be replaced with other orientation process such as the photo-orientation process, as described above.

Evaluation results of an evaluation example 1 to an evaluation example 6 will be explained below.

Evaluation Example 1

Figure 20:
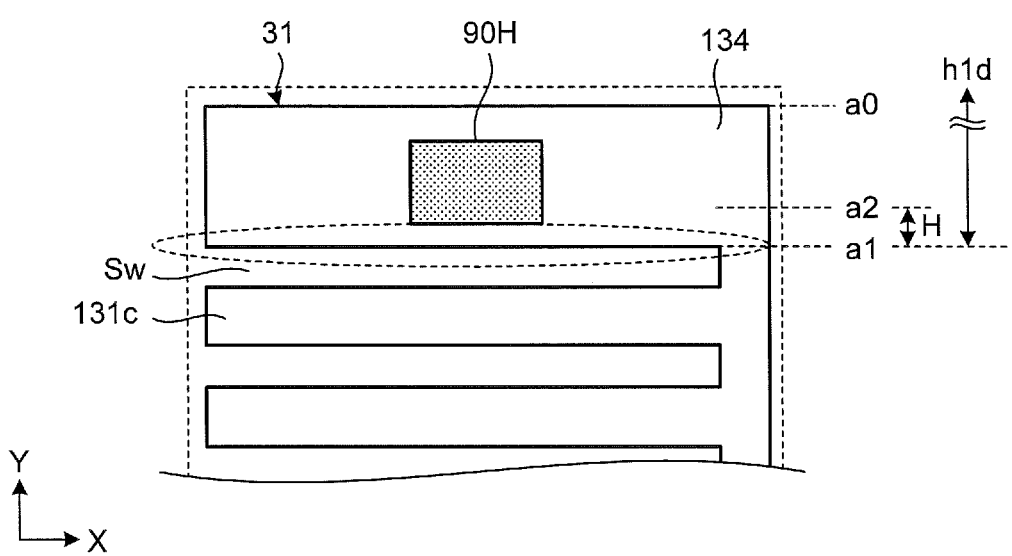
FIG. 20 is a schematic diagram for explaining a relation between a shape of the first electrode and a light blocking position according to a second modification of the second embodiment.
Figure 21:
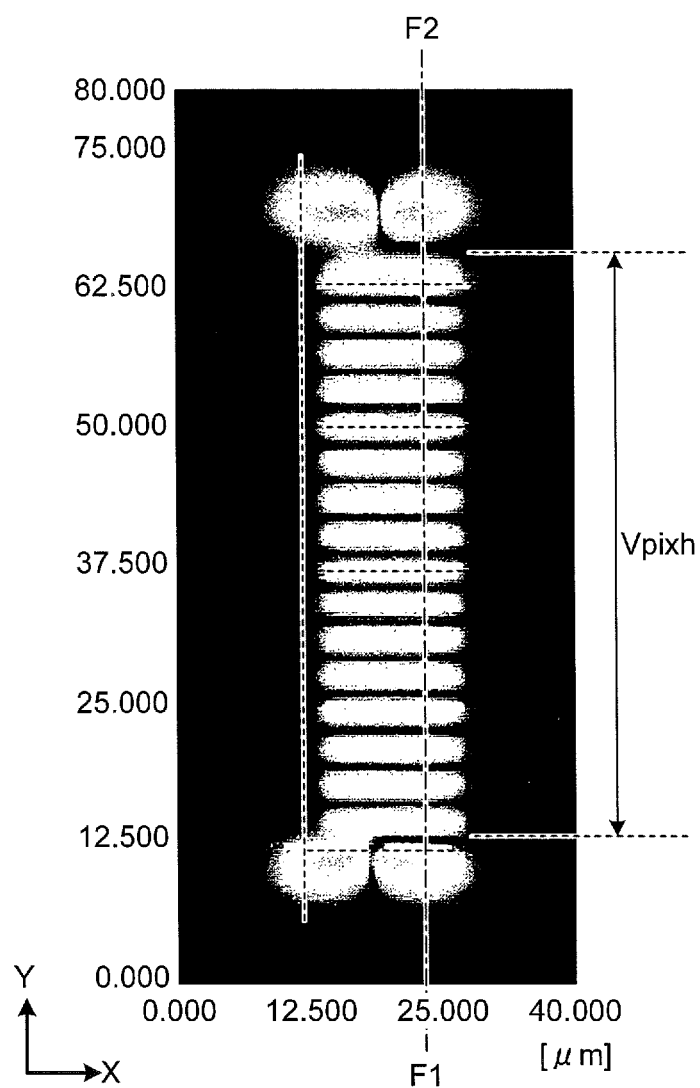
FIG. 21 is an explanatory diagram of an example of an in-plane luminance distribution in the second modification of the second embodiment in FIG. 20.

FIG. 20 is a schematic diagram for explaining a relation between a shape of the first electrode and a light blocking position according to the second modification of the second embodiment. The black matrix 76a has only to block the light up to a positional of a width hid illustrated in FIG. 20 to hide the contact 90H. A comb-shaped portion 134 is arranged near an edge of the opening 76b and coupled to the contact 90H. An electric field applied to the outermost slit Sw, which is provided between the comb-shaped portion 134 and the comb-shaped portion 131c adjacent thereto, is different in distribution from an electric field applied to the slit S between adjacent comb-shaped portions 131c. Therefore, if the black matrix 76a blocks the light up to a position of the width 76h1b illustrated in FIG. 6 to hide the whole of the comb-shaped portion 134, change rates of transmittances of the outermost slit Sw and of the slit S can be close to each other. If the black matrix 76a blocks the light from an outer peripheral edge a0 of the comb-shaped portion 134 to a position a2 of the contact 90H to hide the contact 90H, at least degradation or non-uniformity of brightness can be reduced. This structure allows the luminance in the opening 76b to be uniform. FIG. 21 is an explanatory diagram of an example of an in-plane luminance distribution in the second modification of the second embodiment in FIG. 20.

As illustrated in FIG. 21, it is found that the luminance in portions corresponding to the slit S is high. According to the evaluation example 1, it is found that the uniformity of a high-luminance distribution is high and the non-uniformity of luminance is low except for the edges of an area Vpixh in the Y direction of the pixel Vpix. The outer sides of the area Vpixh have low uniformity, but the black matrix 76a blocks the light in that area, and therefore influence on the area Vpixh can be reduced.

Figure 22:
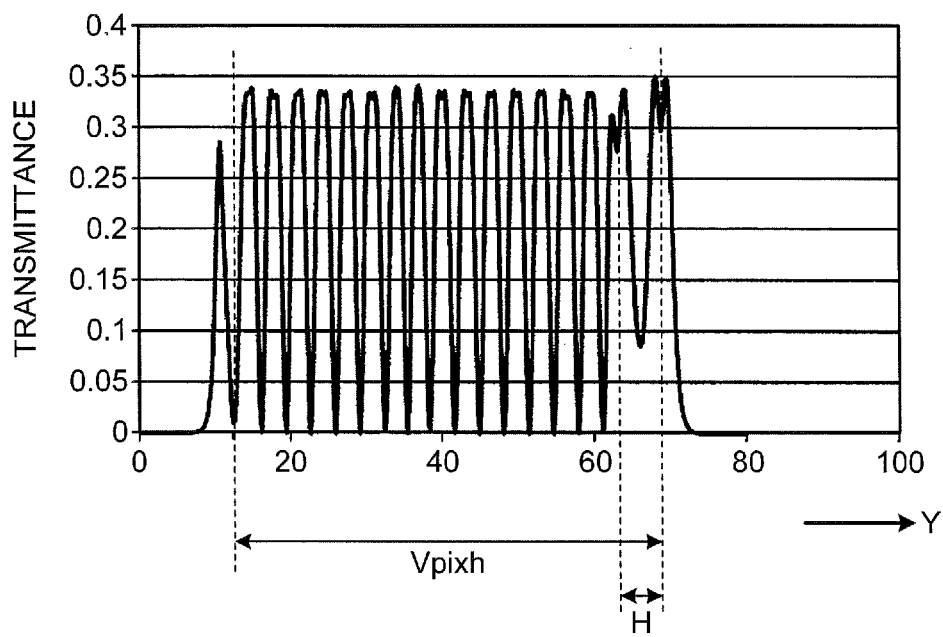
FIG. 22 is an explanatory diagram of a luminance distribution of a cross section of line F1-F2 in FIG. 21.

FIG. 22 is an explanatory diagram of the luminance distribution of a cross section of line F1-F2 in FIG. 21. For example, the brightness (transmittance) is reduced in the position of the comb-shaped portion 134 illustrated in FIG. 20. Therefore, it is found from the evaluation example 1 that the display device according to the second modification of the second embodiment is preferably configured to widen a distance H between the positional and the position a2 illustrated in FIG. 20 than a range where the brightness (transmittance) illustrated in FIG. 22 reduces. The brightness (transmittance) illustrated in FIG. 22 is a transmittance when an incident light is 1 and a polarizer efficiency is 0.5.

Evaluation Example 2

Figure 23:
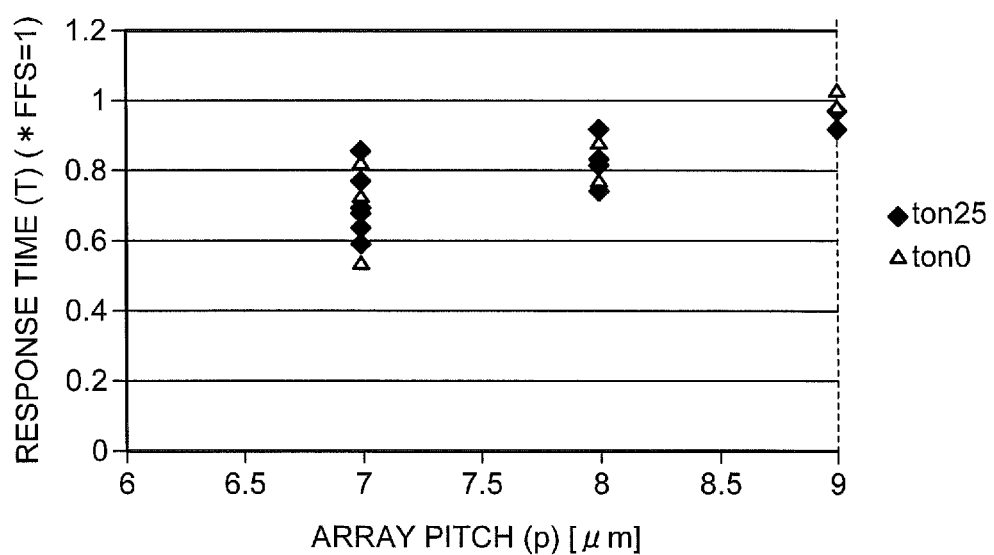
FIG. 23 is an explanatory diagram for explaining a relation between the array pitch (slit pitch) and the response time.

FIG. 23 is an explanatory diagram for explaining a relation between the array pitch (slit pitch) and the response time. The evaluation example 2 illustrated in FIG. 23 is obtained by operating the display device 1 according to the first embodiment at a temperature of 25° C. and a temperature of 0° C. In FIG. 23, marks (ton25) of rhombus represent an evaluation result in which response times (second) of when a voltage is ON (from an OFF state to an ON state) at a temperature of 25° C. are plotted for each array pitch. In FIG. 23, marks (ton0) of triangle represent an evaluation result in which response times (second) of when a voltage is ON (from an OFF state to an ON state) at a temperature of 0° C. are plotted for each array pitch. It is found that the response speed becomes slower when the slit pitch (p) is wider. When the response time (T) is normalized such that the response time in a display device using the conventional FFS mode such as one described in JP-A-2008-52161 is 1, the response time can be made smaller than 1 by setting the array pitch p to be smaller than 9 μm whether the operations are performed at a temperature of 25° C. or a temperature of 0° C.

Evaluation Example 3

Figures 24, 25:
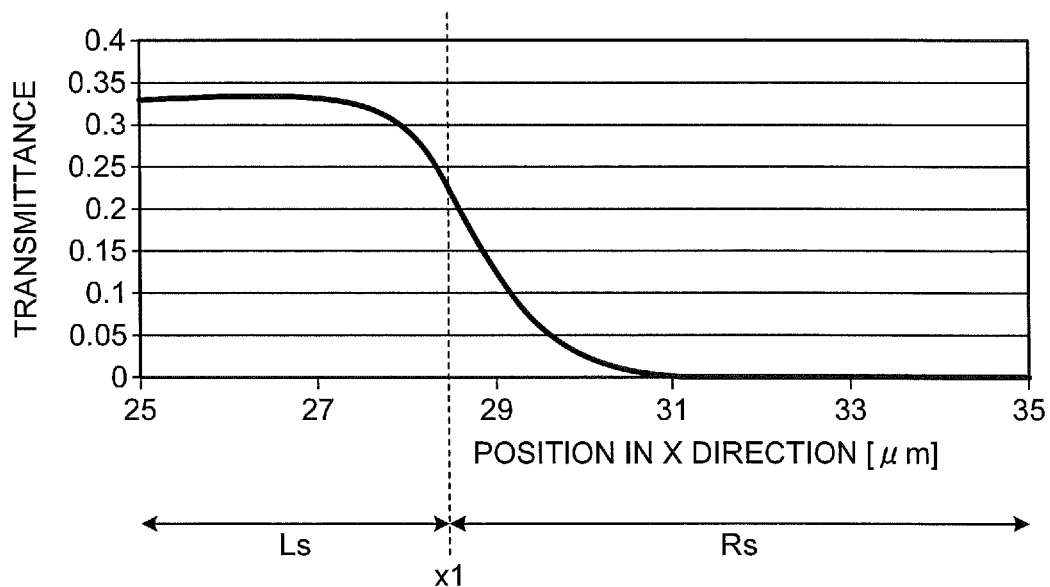
FIG. 24 is an explanatory diagram for explaining a relation between the angle θ at which a long side of a comb-shaped portion is inclined and the protruded length of the comb-shaped portion.
FIG. 25 is an explanatory diagram for explaining the transmittance in an area near a tip of the comb-shaped portion.

FIG. 24 is an explanatory diagram for explaining a relation between the angle θ at which a long side of a comb-shaped portion is inclined and the protruded length of the comb-shaped portion. The evaluation example 3 illustrated in FIG. 24 is obtained by evaluating pixels Vpix in the display device 1 according to the first embodiment each of which has different comb protruded length L2 and angle θ illustrated in FIG. 11. The orientation stability was determined as evaluation criteria. The evaluation criteria of the orientation stability are obtained by checking the quality (e.g., uniformity) of the luminance distribution on the display (planar view) and determining rotation directions in the following manner. A case is determined as "A" in which the rotation direction in an area near one of the long sides of the comb-shaped portions facing in the width direction of the slit is clockwise in an in-plane direction, the rotation direction in an area near the other one of the long sides is counterclockwise in an in-plane direction, and the rotations are stabilized. A case is determined as "C" in which the rotation directions tend to be unevenly clockwise or counterclockwise. A case is determined as "B" in which the rotation direction is unstable and varies in an area near one of the long sides of the comb-shaped portions facing in the width direction of the slit or in an area near the other one of the long sides.

According to the evaluation results illustrated in FIG. 24, when the comb protruded length L2 was 15 μm and the angle θ was zero degrees, the evaluation was determined as "A". According to the evaluation results illustrated in FIG. 24, when the comb protruded length L2 was 15 μm and the angle θ was 0.55 degrees, the evaluation was determined as "A".

According to the evaluation results illustrated in FIG. 24, when the comb protruded length L2 was 30 μm and the angle θ was 0.00 degrees, the evaluation was determined as "C". When the comb protruded length L2 was 30 μm and the angle θ was 0.22 degrees, the evaluation was determined as "C". When the comb protruded length L2 was 30 μm and the angle θ was 0.55 degrees, the evaluation was determined as "B". When the comb protruded length L2 was 30 μm and the angle θ was 0.62 degrees, the evaluation was determined as "A". When the comb protruded length L2 was 30 μm and the angle θ was 0.70 degrees, the evaluation was determined as "B". When the comb protruded length L2 was 30 μm and the angle θ was 1.01 degrees, the evaluation was determined as "A".

According to the evaluation results illustrated in FIG. 24, when the comb protruded length L2 was 62.5 μm and the angle θ was 0.00 degrees, the evaluation was determined as "C". When the comb protruded length L2 was 62.5 μm and the angle θ was 0.69 degrees, the evaluation was determined as "A".

As explained above, when the angle θ is greater than 0.5 degrees regardless of the comb protruded length L2, the liquid crystal rotation directions LCQ in which the liquid crystal molecules rotate are easily regulated, so that the behaviors of the liquid crystal molecules Lcm can be stabilized. Therefore, when the angle θ is greater than 0.5 degrees, the display device 1 according to the first embodiment can allow a displacement of the angle θ and can maintain the orientation stability even if the rubbing direction (Rub) is slightly displaced from the X direction (zero degrees) due to an manufacturing error.

Evaluation Example 4

FIG. 25 is an explanatory diagram for explaining the transmittance in an area near the tip of the comb-shaped portion. The brightness (transmittance) illustrated in FIG. 25 is a transmittance when the incident light is 1 and the polarizer efficiency is 0.5. The evaluation example 4 illustrated in FIG. 25 is obtained by evaluating transmittances in the cross section of line C1 to C2 in FIG. 9 of the display device 1 according to the first embodiment and by extracting the transmittances in an area near the tip 131af of the comb-shaped portion 131a. The position x1 illustrated in FIG. 25 is a position of the tip 131af of the comb-shaped portion 131a. As illustrated in FIG. 25, the brightness (transmittance) approaches zero (black) in the slit area Ls on the boundary around the position x1. For example, as illustrated in FIG. 25, it is found that the brightness (transmittance) becomes almost zero if the position is 3.5 µm or more away from the position x1 on the slit area Rs side. Therefore, because the brightness (transmittance) degrades if the communicating opening is wider, the width W illustrated in FIG. 11 is preferably narrow. As is apparent from the evaluation example 4, the width W illustrated in FIG. 11 is preferably, for example, 7 µm or less. Especially, when the width W illustrated in FIG. 11 is 4 µm or less, the possibility of degradation of the brightness (transmittance) can be further reduced.

Figure 26:
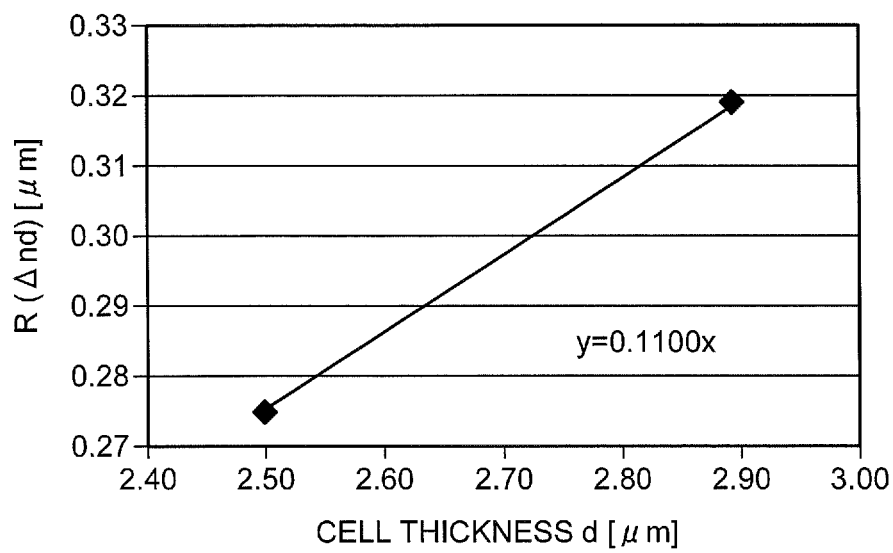
FIG. 26 is an explanatory diagram for explaining a relation between the retardation and the cell thickness.
Figure 27:
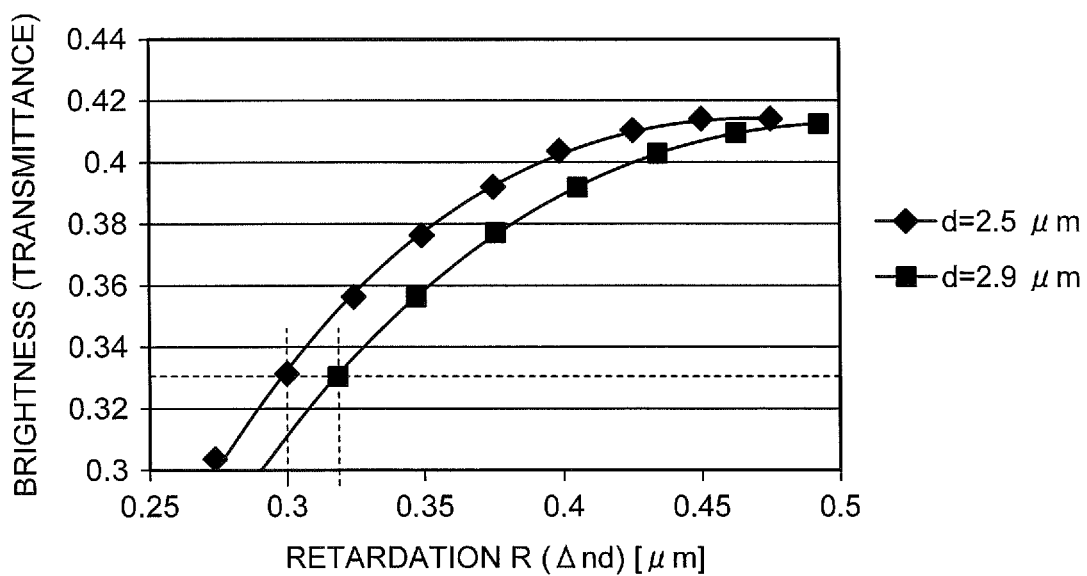
FIG. 27 is an explanatory diagram for explaining a relation between the retardation and the brightness (transmittance)

FIG. 26 is an explanatory diagram for explaining a relation between the retardation and the cell thickness. FIG. 27 is an explanatory diagram for explaining a relation between the retardation and the brightness (transmittance). The brightness (transmittance) illustrated in FIG. 27 is a transmittance when the incident light is 1 and the polarizer efficiency is 0.5. Characteristics of $\Delta nd$ (retardation $R=\Delta n \times d$) in the liquid crystal layer 70C will be explained below with reference to FIG. 26 and FIG. 27. A cell thickness d is a thickness in the Z direction of the liquid crystal layer 70C illustrated in FIG. 4. The difference $\Delta n$ is a refractive index difference of the liquid crystal in the liquid crystal layer 70C, and $\Delta n=(ne-no)$. Of the refractive indices (ne, no) of nematic liquid crystal, ne is an extraordinary light refractive index (refractive index parallel to a long-axis direction of liquid crystal molecules), and no is an ordinary light refractive index (refractive index perpendicular to the long-axis direction of liquid crystal molecules). When the refractive index difference in the liquid crystal layer 70C is $\Delta n$, the retardation R is a phase difference of when the light transmits the liquid crystal layer 70C having birefringence (also referred to as refractive index anisotropy). The retardation R can be calculated using $R=\Delta n \times d$. The intensity of transmissive light in the liquid crystal layer 70C becomes a maximum when $R(\Delta nd)=m\lambda$ (m: integer, $\lambda$: light wavelength) is satisfied.

As illustrated in FIG. 26, it is found that the display device 1 according to the first embodiment has a different optimal $R(\Delta nd)$ in accordance with the cell thickness d of the liquid crystal layer 70C. According to the evaluation example of FIG. 26, when the cell thickness d is plotted on the x-axis and $R(\Delta nd)$ is plotted on the y-axis, a function: $y=0.11x$ can be obtained.

In FIG. 27, the brightness is plotted on the y-axis and the retardation R is plotted on the x-axis. In FIG. 27, marks of rectangle represent an evaluation result in which the brightness and the retardation R in the case where the cell thickness d is 2.9 µm are plotted. Marks of rhombus represent an evaluation result in which the brightness and the retardation R in the case where the cell thickness d is 2.5 µm are plotted. Because $\Delta nd$ is wavelength-dependent, if the wavelength is longer, $\Delta nd$ is likely to be smaller, and if the wavelength is shorter, $\Delta nd$ is likely to be greater. Furthermore, a relation between $\Delta nd$ brightness is proportional to a value obtained by dividing $\Delta nd$ by the wavelength. Therefore, as illustrated in FIG. 27, if the brightness is higher, the color of a pixel is likely to become yellow, and if the brightness is lower, the color of a pixel is likely to become blue. As a result, the liquid crystal layer 70C preferably has $R(\Delta nd)$ that is darker than the maximum transmittance for each pixel color (color filters 76R, 76G, and 76B), for example. An $R(\Delta nd)$ value is preferably a value indicated by a dotted line or more illustrated in FIG. 27 in which the brightness (luminance) is about 80%. In other words, an appropriate condition of $R(\Delta nd)$ is $R(\Delta nd) \geq 0.11 \times d$. For example, when the cell thickness d is 2.5 µm, $R \geq 0.275$ µm should be satisfied, and when the cell thickness d is 2.9 µm, $R \geq 0.319$ µm should be satisfied. The refractive index difference $\Delta n$ and the cell thickness d of the liquid crystal in the liquid crystal layer 70C are determined based on the R condition.

Evaluation Example 5

Figure 28:
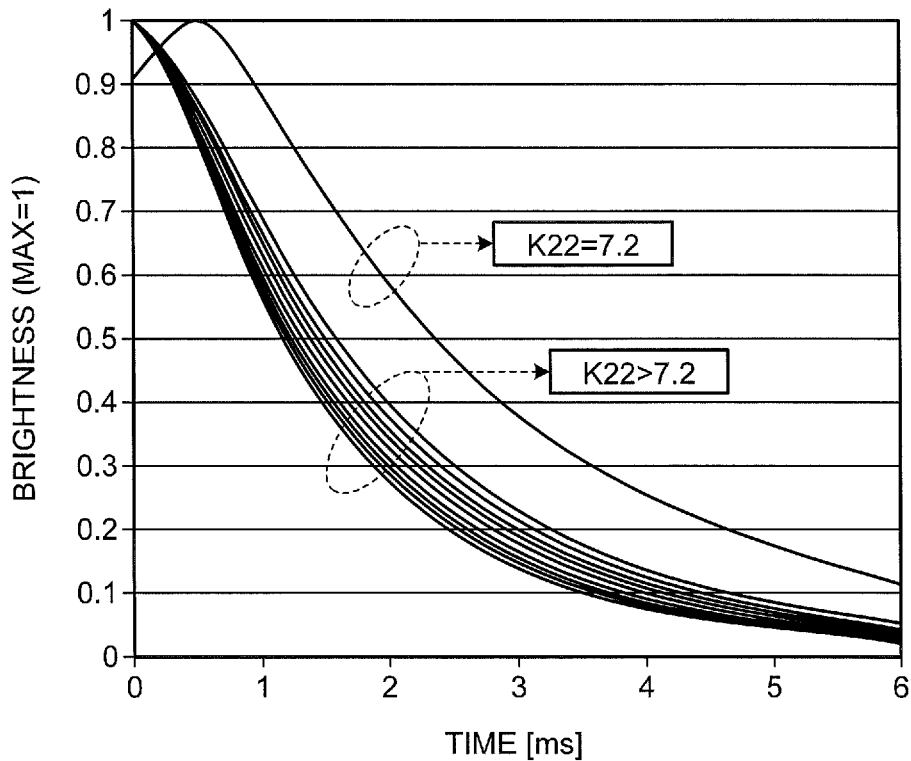
FIG. 28 is an explanatory diagram for explaining elastic characteristics of the liquid crystal.

FIG. 28 is an explanatory diagram for explaining elastic characteristics of the liquid crystal. The evaluation result illustrated in FIG. 28 represents relations between the time (ms) and the brightness corresponding to elastic constants (specifically, K22) of the liquid crystal in the liquid crystal layer 70C. The liquid crystal molecules (nematic liquid crystal) in the liquid crystal layer 70C preferably have a twist elastic constant K22 as an elastic constant K. The twist elastic constant K22 corresponds to the elastic constant of when the liquid crystal molecules rotate (twist) in the X-Y plane.

FIG. 28 represents a graph of a relation between the brightness and the time (ms) corresponding to the value of each twist elastic constant K22. The time is a response time required for changing the brightness (transmittance) when the voltage is changed from OFF to ON, i.e., a time required for rotation of the liquid crystal molecules. The brightness is normalized such that its maximum is 1. In FIG. 28, a group of curves in the case where the elastic constant K22 is greater than 7.2 and a curve in the case where K22 is equal to 7.2 are plotted therein.

As explained above, the display device 1 according to the first embodiment and the second embodiment achieves quicker response by actively using the elastic energy of the liquid crystal. The display device 1 according to the first embodiment and the second embodiment uses the rotations of the liquid crystal molecules Lcm illustrated in FIG. 9. Therefore, the elastic constant K (especially, K22) is preferably as great as possible. When the elastic constant K22 is too small, for example, K22 is 7.2, the response speed becomes low as compared with the case where K22 is greater than 7.2, as illustrated in FIG. 28.

Evaluation Example 6

Figure 29:
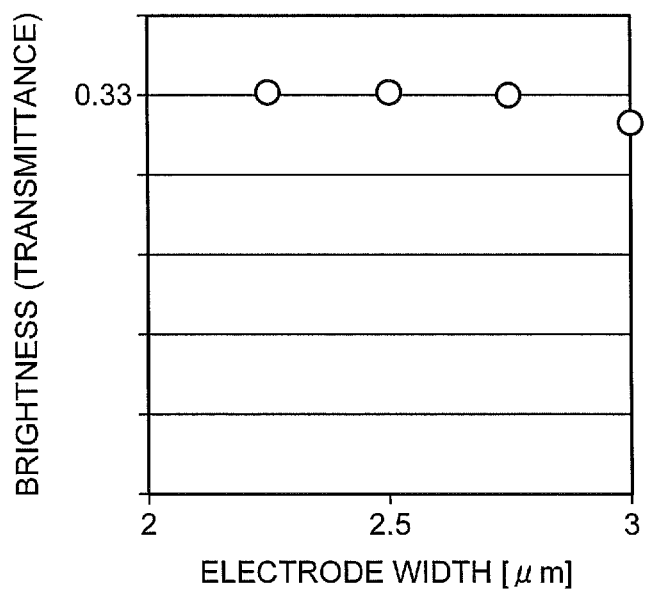
FIG. 29 is an explanatory diagram for explaining a relation between the width of the comb-shaped portion and the maximum transmittance.

FIG. 29 is an explanatory diagram for explaining a relation between the width of the comb-shaped portion and the maximum transmittance. The evaluation result illustrated in FIG. 29 represents a relation between the width w2 illustrated in FIG. 11 and the maximum transmittance (%) in the display device 1 according to the first embodiment. The evaluation example 6 evaluates the brightness (transmittance) with respect to the electrode width (width of the comb-shaped portion) in the case where the cell thickness d is 2.5 µm and the retardation $R(\Delta nd)$ is 0.3 illustrated in FIG. 27. When the maximum transmittance in the cases where the widths w2 are respectively 2.25 µm, 2.5 µm, 2.75 µm, and 3 µm is compared with each other assuming that the array pitch (slit pitch) p illustrated in FIG. 11 is 5.5 µm, as illustrated in FIG. 29, it is found that the maximum transmittance is hard to change in the case where the width w2 illustrated in FIG. 11 is 2.25 µm, 2.5 µm, or 2.75 µm. By setting the width w2 to 2.75 µm or less with respect to the array pitch (slit pitch) p, the influence of manufacturing variations can be reduced. In this way, the comb-shaped portion 131a and the comb-shaped portion 131b according to the first embodiment are structured that the width w2 in the Y direction at the protrusion start position x0 of the electrode base portion 132 is smaller than a number obtained by multiplying the array pitch p of adjacent comb-shaped portions 131a or of adjacent comb-shaped portions 131b by 0.5. As described above, when the comb-shaped portion 131a or the comb-shaped portion 131b according to the first embodiment is structured that the width w2 in the Y direction at the protrusion start position x0 of the electrode base portion 132 is smaller than the number obtained by multiplying the array pitch p of adjacent comb-shaped portions 131a or of adjacent comb-shaped portions 131b by 0.5, the fluctuation of the maximum transmittance can be reduced.

Figure 30:
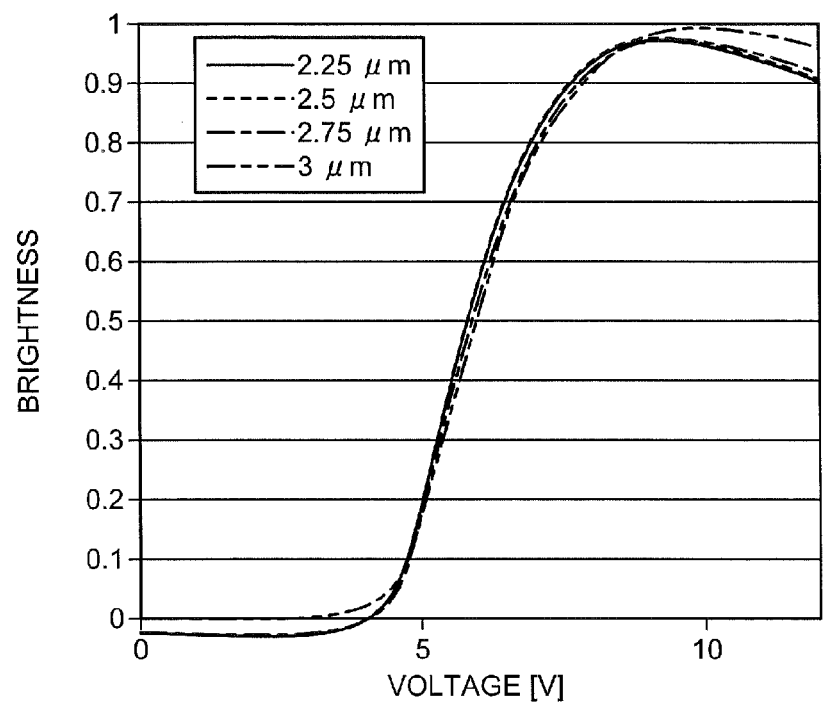
FIG. 30 is an explanatory diagram for explaining relations between the width of a comb-shaped portion and the voltage.
Figure 31:
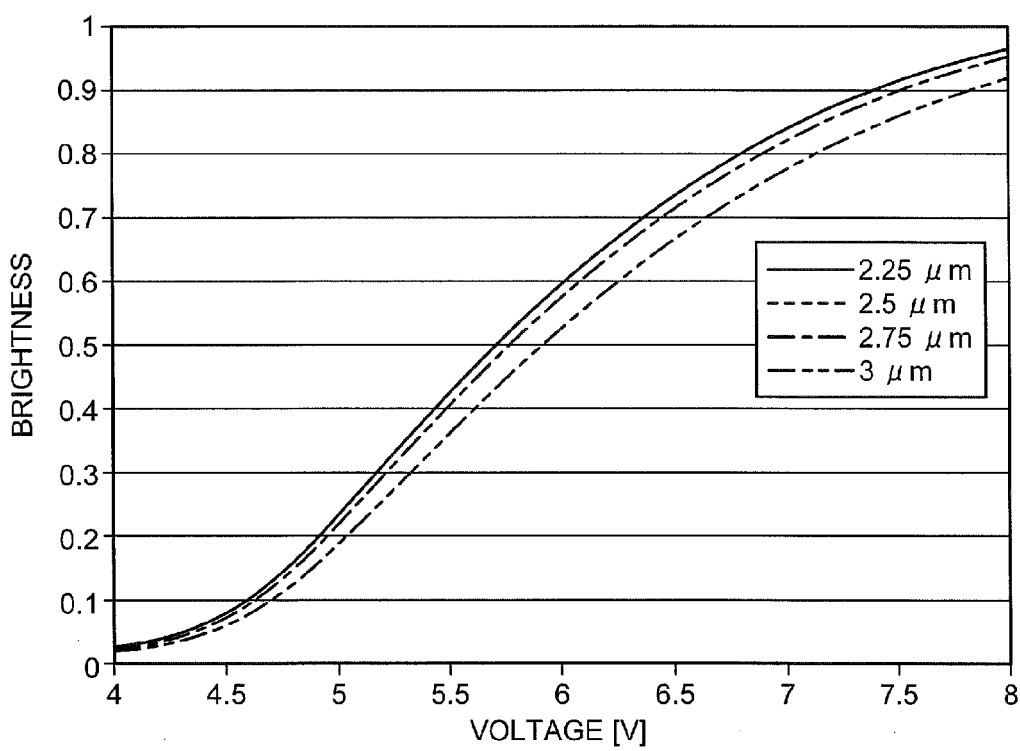

FIG. 30 is an explanatory diagram for explaining relations between the width of a comb-shaped portion and the voltage when a transmittance. In the examples illustrated in FIG. 30, the brightness is normalized such that the brightness in the case where a width of the comb-shaped portion is 3 µm is 1. FIG. 31 is a partially enlarged view in which FIG. 30 is partially enlarged. Based on the evaluation result of the evaluation example 6, a relation between the voltage to be applied and the brightness is estimated for each of the cases where the widths w2 illustrated in FIG. 11 are respectively 2.25 µm, 2.5 µm, 2.75 µm, and 3 µm. Then, it is found that the shift amount of the voltage is small between the case where the width w2 illustrated in FIG. 11 is 2.25 µm and the case where the width w2 is 2.5 µm. As illustrated in FIG. 31, it is found that graphs indicating the case where the width w2 illustrated in FIG. 11 is 2.25 µm and the case where the width w2 is 2.5 µm substantially overlap each other. According to the evaluation result of the evaluation example 6, it is found that the comb-shaped portion 131a and the comb-shaped portion 131b according to the first embodiment are preferably structured such that the width w2 in the Y direction at the protrusion start position x0 of the electrode base portion 132 is smaller than a number obtained by multiplying the array pitch p of adjacent comb-shaped portions 131a or of adjacent comb-shaped portions 131b by 0.45. With this structure, the width w2 in the Y direction can be set to a width in which the fluctuation of the transmittance is small with respect to the voltage to be applied to the comb-shaped portion 131a and to the comb-shaped portion 131b. As a result, even if the width w2 in the Y direction fluctuates, the degradation of the maximum transmittance at which the light transmits the pixel Vpix can be decreased with respect to the comb-shaped portion 131a or the comb-shaped portion 131b to which the same voltage is applied.

2. APPLICATION EXAMPLES

Application examples of the display device 1 explained in the first and the second embodiments and the modifications thereof will be explained below with reference to FIG. 32 to FIG. 45. FIG. 32 to FIG. 45 are diagrams of examples of an electronic apparatus to which the liquid crystal display device according to one of the embodiments or the modifications thereof is applied. The display device 1 according to one of the embodiments or the modifications thereof can be applied to electronic apparatuses in all areas such as portable electronic apparatuses such as mobile telephones and smartphones, television devices, digital cameras, notebook personal computers, video cameras, or indicators mounted on vehicles. In other words, the display device 1 according to one of the embodiments or the modifications thereof can be applied to electronic apparatuses in all areas that display an externally input video signal or an internally generated video signal as an image or a video. The electronic apparatuses include a control device that supplies a video signal to the display device 1 to control operations of the display device 1.

Application Example 1

Figure 32:
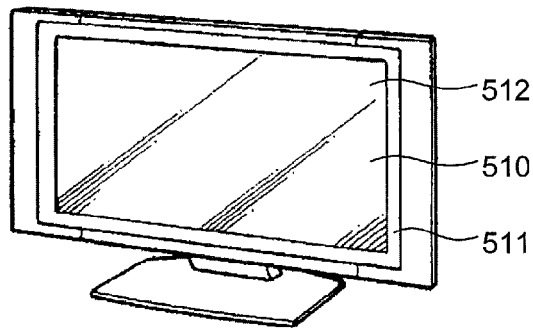
FIG. 32 is a diagram of an example of an electronic apparatus to which the liquid crystal display device according to one of the embodiments or the modifications thereof is applied.

The electronic apparatus illustrated in FIG. 32 is a television device to which the display device 1 according to one of the embodiments or the modifications thereof is applied. Examples of the television device include, but are not limited to, a video display screen unit 510 including a front panel 511 and a filter glass 512, and the video display screen unit 510 is the display device 1 according to one of the embodiments or the modifications thereof.

Application Example 2

Figure 33:
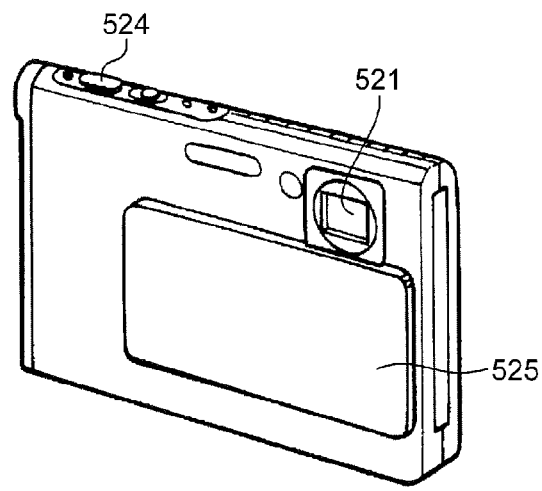
FIG. 33 is a diagram of an example of an electronic apparatus to which the liquid crystal display device according to one of the embodiments or the modifications thereof is applied.
Figure 34:
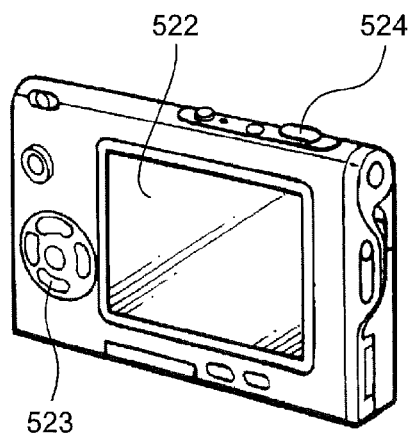
FIG. 34 is a diagram of an example of the electronic apparatus to which the liquid crystal display device according to one of the embodiments or the modifications thereof is applied.

The electronic apparatus illustrated in FIG. 33 and FIG. 34 is a digital camera to which the display device 1 according to one of the embodiments or the modifications thereof is applied. Examples of the digital camera include, but are not limited to, a light emitting unit 521 for a flash, a display unit 522, a menu switch 523, and a shutter button 524, and the display unit 522 is the display device 1 according to one of the embodiments or the modifications thereof. As illustrated in FIG. 33, the digital camera has a lens cover 525, and by sliding the lens cover 525, a photographing lens comes out. The digital camera is capable of taking digital photos by capturing light incident through the photographing lens.

Application Example 3

Figure 35:
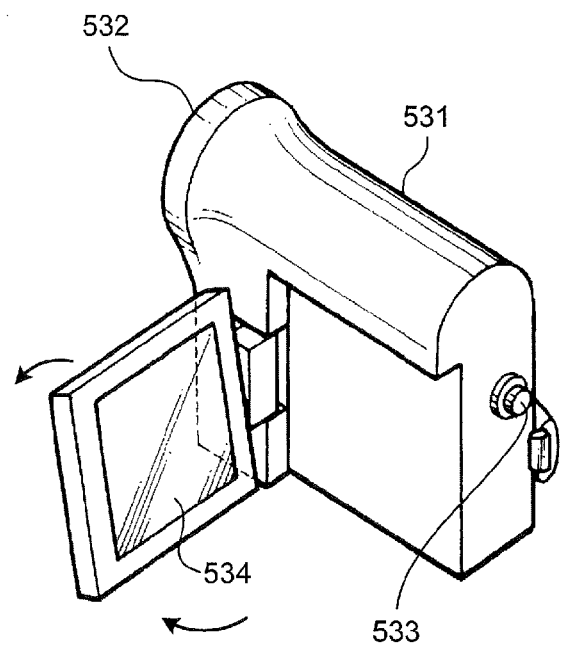
FIG. 35 is a diagram of an example of an electronic apparatus to which the liquid crystal display device according to one of the embodiments or the modifications thereof is applied.

The electronic apparatus illustrated in FIG. 35 represents an appearance of a video camera to which the display device 1 according to one of the embodiments or the modifications thereof is applied. Examples of the video camera include, but are not limited to, a main body 531, a lens 532 for photographing a subject provided on the front side face of the main body 531, a start/stop switch 533 in photographing, and a display unit 534. The display unit 534 is the display device 1 according to one of the embodiments or the modifications thereof.

Application Example 4

Figure 36:
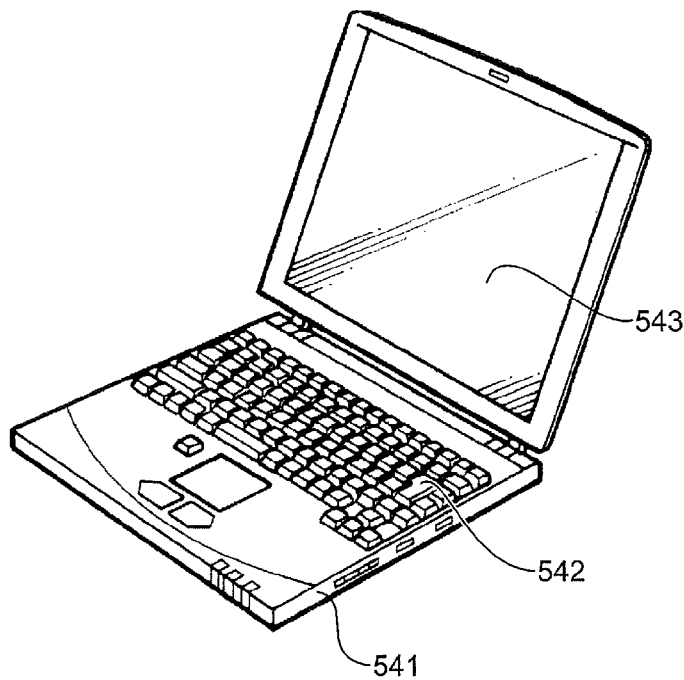
FIG. 36 is a diagram of an example of an electronic apparatus to which the liquid crystal display device according to one of the embodiments or the modifications thereof is applied.

The electronic apparatus illustrated in FIG. 36 is a notebook personal computer to which the display device 1 according to one of the embodiments or the modifications thereof is applied. Examples of the notebook personal computer include, but are not limited to, a main body 541, a keyboard 542 for performing an input operation of text and the like, and a display unit 543 for displaying an image. The display unit 543 is the display device 1 according to one of the embodiments or the modifications thereof.

Application Example 5

Figure 37:
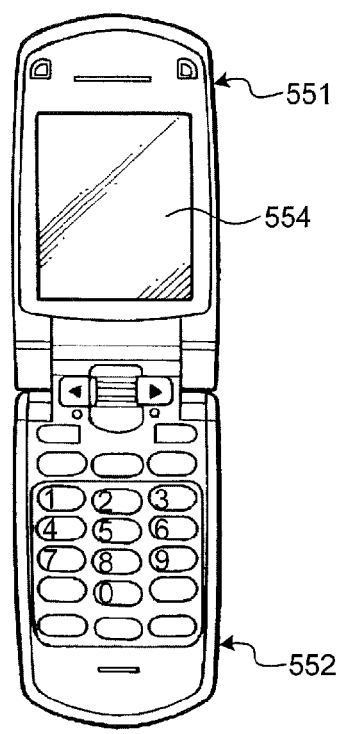
FIG. 37 is a diagram of an example of an electronic apparatus to which the liquid crystal display device according to one of the embodiments or the modifications thereof is applied.
Figure 38:
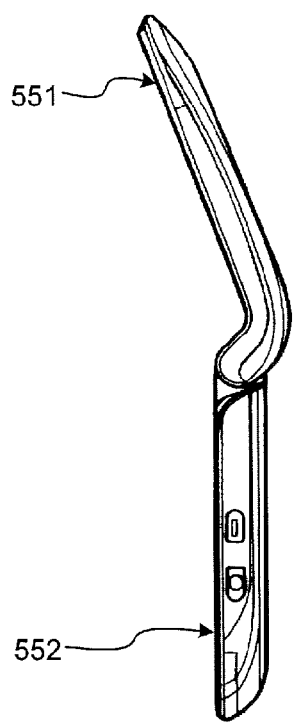
FIG. 38 is a diagram of an example of the electronic apparatus to which the liquid crystal display device according to one of the embodiments or the modifications thereof is applied.
Figure 39:
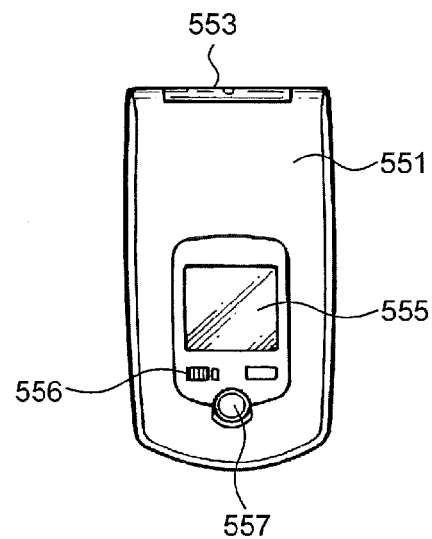
FIG. 39 is a diagram of an example of the electronic apparatus to which the liquid crystal display device according to one of the embodiments or the modifications thereof is applied.
Figure 40:
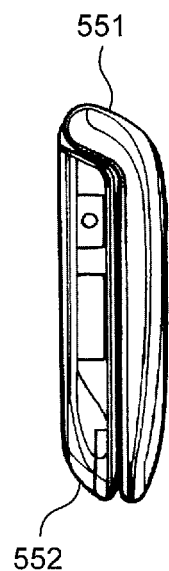
FIG. 40 is a diagram of an example of the electronic apparatus to which the liquid crystal display device according to one of the embodiments or the modifications thereof is applied.
Figure 41:
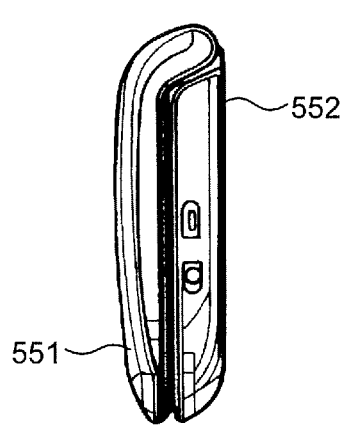
FIG. 41 is a diagram of an example of the electronic apparatus to which the liquid crystal display device according to one of the embodiments or the modifications thereof is applied.
Figure 42:
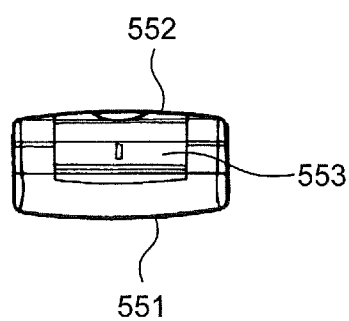
FIG. 42 is a diagram of an example of the electronic apparatus to which the liquid crystal display device according to one of the embodiments or the modifications thereof is applied.
Figure 43:
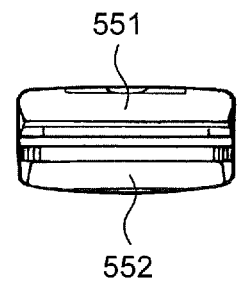
FIG. 43 is a diagram of an example of the electronic apparatus to which the liquid crystal display device according to one of the embodiments or the modifications thereof is applied.

The electronic apparatus illustrated in FIG. 37 to FIG. 43 is a mobile phone to which the display device 1 is applied. FIG. 37 is a front view of the mobile phone in its opened state, FIG. 38 is a right side view of the mobile phone in the opened state, FIG. 39 is a front view of the mobile phone in its folded state, FIG. 40 is a left side view of the mobile phone in the folded state, FIG. 41 is a right side view of the mobile phone in the folded state, FIG. 42 is a top view of the mobile phone in the folded state, and FIG. 43 is a bottom view of the mobile phone in the folded state. The mobile phone is the one that has, for example, an upper housing 551 and a lower housing 552 connected to each other with a connecting unit (hinge unit) 553, and that includes a display 554, a sub-display 555, a picture light 556, and a camera 557. The display device 1 is mounted on the display 554. Therefore, the display 554 of the mobile phone may have a function of detecting a touch operation in addition to a function of displaying images.

Application Example 6

Figure 44:
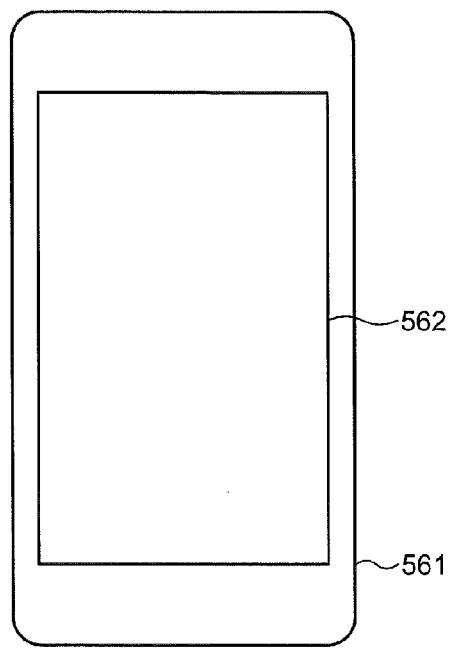
FIG. 44 is a diagram of an example of an electronic apparatus to which the liquid crystal display device according to one of the embodiments or the modifications thereof is applied.

The electronic apparatus illustrated in FIG. 44 is a portable information device that operates as a portable computer, a multifunctional mobile phone, a portable computer capable of performing voice communication, or as a portable computer capable of performing communication, and that is sometimes referred to as so-called a smartphone or a tablet terminal. The portable information terminal has a display unit 562 on the surface of, for example, a housing 561. The display unit 562 is the display device 1 according to one of the embodiments or the modifications thereof.

Application Example 7

Figure 45:
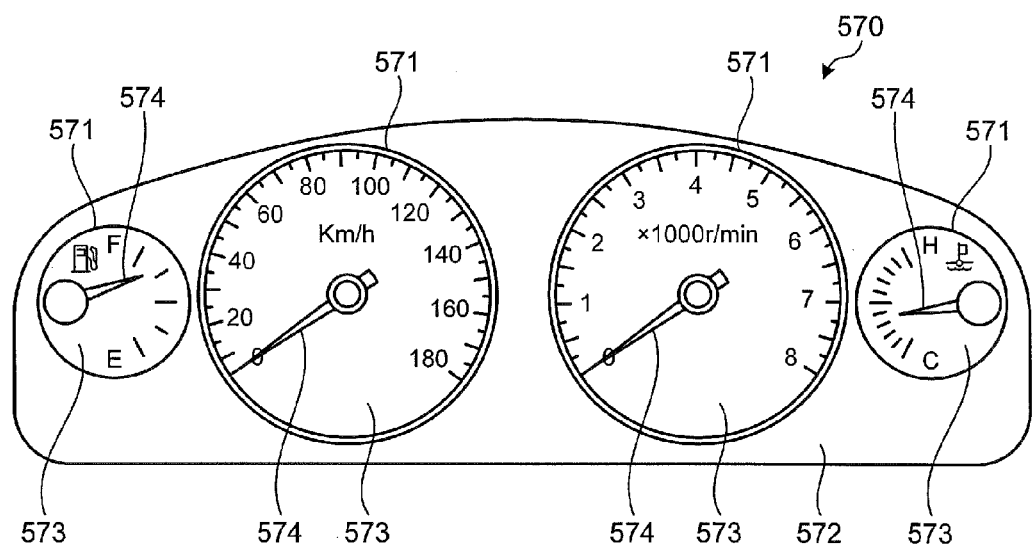
FIG. 45 is a diagram of an example of an electronic apparatus to which the liquid crystal display device according to one of the embodiments or the modifications thereof is applied.

FIG. 45 is a schematic configuration diagram of a meter unit to which the display device 1 according to one of the embodiments or the modifications thereof is applied. The electronic apparatus illustrated in FIG. 45 is a meter unit mounted on vehicles. A meter unit (electronic apparatus) 570 illustrated in FIG. 45 includes a plurality of liquid crystal display devices 1 according to one of the embodiments or the modifications thereof such as a fuel meter, a water temperature meter, a speed meter, and a tachometer as liquid crystal display devices 571. All the liquid crystal display devices 571 are covered with a piece of face panel 572.

Each of the liquid crystal display devices 571 illustrated in FIG. 45 is structured to combine a liquid crystal panel 573 as a liquid crystal displaying unit with a movement mechanism as an analog displaying unit. The movement mechanism includes a motor as a driving unit and an indicator 574 rotated by the motor. As illustrated in FIG. 45, each of the liquid crystal display devices 571 is capable of displaying scale marks, warning, or the like on the display surface of the liquid crystal panel 573 and also capable of rotating the indicator 574 of the movement mechanism on the display surface side of the liquid crystal panel 573.

FIG. 45 represents a structure with the liquid crystal display devices 571 provided on one piece of face panel 572; however, the embodiment is not limited thereto. A unit of liquid crystal display device 571 is provided on an area surrounded by the face panel 572, and the fuel meter, the water temperature meter, the speed meter, the tachometer, or so may be displayed on the liquid crystal display device 571.

3. ASPECTS OF PRESENT DISCLOSURE

The present disclosure includes aspects as follows.
(1) A liquid crystal display device comprising:
a first substrate and a second substrate that face each other;
a liquid crystal layer provided between the first substrate and the second substrate; and
a first electrode and a second electrode provided between the first substrate and the liquid crystal layer, wherein the first electrode includes:
an electrode base portion that extends in a first direction; and
a plurality of comb-shaped portions that protrude from the electrode base portion at a fixed distance away from each other, and extend in a second direction different from the first direction, and
each of the comb-shaped portions is configured such that a width thereof at a protrusion start position of the electrode base portion is smaller than a number obtained by multiplying an array pitch of adjacent comb-shaped portions by 0.5.

(2) The liquid crystal display device according to (1), wherein the width of the comb-shaped portion at the protrusion start position of the electrode base portion is smaller than a number obtained by multiplying the array pitch of adjacent comb-shaped portions by 0.45.

(3) The liquid crystal display device according to (1), wherein the first electrode and the second electrode are arranged in a position where a horizontal electric field for driving the liquid crystal layer is generated.

(4) The liquid crystal display device according to (3), wherein the first electrode is layered over the second electrode via an insulating layer.

(5) The liquid crystal display device according to (1), wherein
when a voltage is applied between the first electrode and the second electrode,
in the liquid crystal layer, liquid crystal molecules in an area near one of long sides of the comb-shaped portions that face each other in a width direction of a slit between adjacent comb-shaped portions and liquid crystal molecules in an area near the other one of the long sides of the comb-shaped portions that face each other rotate in opposite directions to each other.

(6) The liquid crystal display device according to (1), further comprising:
a first orientation film provided between the first electrode and the liquid crystal layer; and
a second orientation film provided between the second substrate and the liquid crystal layer, wherein
the first orientation film is subjected to an orientation process in a first orientation direction that is a parallel direction to the second direction,
the second orientation film is subjected to an orientation process in a second orientation direction that is antiparallel to the first orientation direction, and
when a voltage is not applied between the first electrode and the second electrode,
long axes of liquid crystal molecules are aligned and oriented in the first orientation direction.

(7) The liquid crystal display device according to (6), wherein
when a voltage is applied between the first electrode and the second electrode,
long-axis directions of the liquid crystal molecules are oriented so that the liquid crystal molecules rise toward a direction perpendicular to the first substrate while rotating clockwise in an area near one of long sides of the comb-shaped portions that face each other in a width direction of a slit and rotating counterclockwise in an area near the other one in an in-plane direction of the first substrate.

(8) The liquid crystal display device according to (1), wherein a comb protruded length by which the comb-shaped portion protrudes from the electrode base portion in the second direction is equal to or less than 45 μm.

(9) The liquid crystal display device according to (8), wherein a width of the electrode base portion in the second direction is equal to or less than 4 μm.

(10) The liquid crystal display device according to (1), wherein one of the first electrode and the second electrode is one of pixel electrodes each of which is partitioned for each pixel, the pixel electrodes are arrayed in a matrix, and the second direction is different from directions in which the pixel electrodes are arrayed in a row and in a column.

(11) An electronic apparatus comprising:

a liquid crystal display device according to (1); and a control device that supplies an input signal to the liquid crystal display device.

According to the present disclosure, it is possible to provide the liquid crystal display device and the electronic apparatus with the liquid crystal display device capable of improving a response speed and reducing a light transmission loss.

What is claimed is:

1. A liquid crystal display device comprising:
    a first substrate and a second substrate that face each other;
    a liquid crystal layer provided between the first substrate and the second substrate;
    a first electrode and a second electrode provided between the first substrate and the liquid crystal layer, the first electrode being layered over the second electrode via an insulating layer such that a horizontal electric field for driving the liquid crystal layer is generated between the first electrode and the second electrode;
    a first orientation film provided between the first electrode and the liquid crystal layer; and
    a second orientation film provided between the second substrate and the liquid crystal layer,
    wherein the first electrode includes:
        an electrode base portion that extends in a first direction; and
        a plurality of comb-shaped portions that protrude from the electrode base portion at a fixed distance away from each other and that extend in a second direction different from the first direction, each of the comb-shaped portions having
            a comb start width in the first direction at a protrusion start position of the comb-shaped portion and
            a comb tip width in the first direction at a tip of the comb-shaped portion,
    wherein each of the comb-shaped portions has a trapezoidal shape such that the comb start width is wider than the comb tip width,
    wherein the comb start width is smaller than a value obtained by multiplying an array pitch of adjacent comb-shaped portions by 0.5, the array pitch being smaller than 9 μm,
    wherein the first orientation film is subjected to an orientation process in a first orientation direction that is a parallel direction to the second direction,
    wherein the second orientation film is subjected to an orientation process in a second orientation direction that is antiparallel to the first orientation direction, and
    wherein, when a voltage is not applied between the first electrode and the second electrode, long axes of liquid crystal molecules are aligned and oriented in the first orientation direction.

2. The liquid crystal display device according to claim 1, wherein the comb start width is smaller than a value obtained by multiplying the array pitch of adjacent comb-shaped portions by 0.45.

3. The liquid crystal display device according to claim 1, wherein when a voltage is applied between the first electrode and the second electrode, in the liquid crystal layer, liquid crystal molecules in an area near one of long sides of the comb-shaped portions that face each other in a width direction of a slit between adjacent comb-shaped portions and liquid crystal molecules in an area near the other one of the long sides of the comb-shaped portions that face each other rotate in opposite directions to each other.

4. The liquid crystal display device according to claim 1, wherein when a voltage is applied between the first electrode and the second electrode, long-axis directions of the liquid crystal molecules are oriented so that the liquid crystal molecules rise toward a direction perpendicular to the first substrate while rotating clockwise in an area near one of long sides of the comb-shaped portions that face each other in a width direction of a slit and rotating counterclockwise in an area near the other one in an in-plane direction of the first substrate.

5. The liquid crystal display device according to claim 1, wherein a comb protruded length by which the comb-shaped portion protrudes from the electrode base portion in the second direction is equal to or less than 45 μm.

6. The liquid crystal display device according to claim 5, wherein the comb start width is equal to or less than 4 μm.

7. The liquid crystal display device according to claim 1, wherein one of the first electrode and the second electrode is one of pixel electrodes each of which is partitioned for each pixel, the pixel electrodes are arrayed in a matrix, and the second direction is different from directions in which the pixel electrodes are arrayed in a row and in a column.

8. An electronic apparatus comprising:

a liquid crystal display device according to claim 1; and a control device that supplies an input signal to the liquid crystal display device.

9. The liquid crystal display device according to claim 1, wherein the electrode base portions include a first electrode base portion and a second electrode base portion that is adjacent to the first electrode base portion in the second direction, the comb-shaped portions include:

a first comb-shaped portion that extends from the first electrode base portion, the first comb-shaped portion having a first tip; and a second comb-shaped portion that extends from the second electrode base portion, the second comb-shaped portion having a second tip, the first tip faces the second electrode base portion and the second tip faces the first electrode base portion, and the first tip and the second tip are alternately arranged in the first direction.

10. The liquid crystal display device according to claim 1, wherein
　　each of the comb-shaped portions has a first long side and a second long side,
　　the first long side and the second long side are each inclined by an angle θ with respect to a center line that extends in the second direction through a center of each comb-shaped portion in the first direction, and
　　the angle θ is in a range of 0.5 degrees to 1.0 degrees.

* * * * *